(12) United States Patent
Pennypacker et al.

(10) Patent No.: US 12,469,605 B2
(45) Date of Patent: Nov. 11, 2025

(54) MACHINE LEARNING ALGORITHM FOR PREDICTING CLINICAL OUTCOMES AND IDENTIFYING DRUG TARGETS IN ISCHEMIC STROKE

(71) Applicant: UNIVERSITY OF KENTUCKY RESEARCH FOUNDATION, Lexington, KY (US)

(72) Inventors: Keith R. Pennypacker, Lexington, KY (US); Justin F. Fraser, Lexington, KY (US); Qiang Cheng, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 857 days.

(21) Appl. No.: 17/768,181

(22) PCT Filed: Oct. 13, 2020

(86) PCT No.: PCT/US2020/055407
§ 371 (c)(1),
(2) Date: Apr. 11, 2022

(87) PCT Pub. No.: WO2021/072404
PCT Pub. Date: Apr. 15, 2021

(65) Prior Publication Data
US 2023/0134886 A1 May 4, 2023

Related U.S. Application Data

(60) Provisional application No. 62/945,705, filed on Dec. 9, 2019, provisional application No. 62/913,474, filed on Oct. 10, 2019.

(51) Int. Cl.
| | |
|---|---|
| *C12Q 1/68* | (2018.01) |
| *C12P 19/34* | (2006.01) |
| *C12Q 1/6883* | (2018.01) |
| *G16B 25/10* | (2019.01) |
| *G16B 40/20* | (2019.01) |
| *G16H 50/30* | (2018.01) |

(52) U.S. Cl.
CPC .......... *G16H 50/30* (2018.01); *C12Q 1/6883* (2013.01); *G16B 25/10* (2019.02); *G16B 40/20* (2019.02); *C12Q 2600/158* (2013.01)

(58) Field of Classification Search
CPC .................. C12Q 1/6883; C12Q 2600/158
See application file for complete search history.

(56) References Cited

U.S. PATENT DOCUMENTS

| | | |
|---|---|---|
| 6,946,438 B1 | 9/2005 | Nagai et al. |
| 2016/0140300 A1 | 5/2016 | Purdie et al. |
| 2016/0258019 A1 | 9/2016 | Baird et al. |
| 2019/0017117 A1 | 1/2019 | Barr et al. |

OTHER PUBLICATIONS

Qiagen Array Layout for PCR Plates "RT² Profiler PCR Array (96-Well Format and 384-Well [4 × 96] Format)—Human Inflammatory Cytokines & Receptors" material for Cat. no. 330231 (PAHS-011ZA) (2011) from https://geneglobe.qiagen.com/us/product-groups/rt2-profiler-pcr-arrays/PAHS-011Z (Year: 2011).*
Stone SF, Armstrong C, van Eeden PE, Arendts G, Hankey GJ, Brown SG, Fatovich DM. Changes in differential gene expression during a fatal stroke. Journal of Clinical Neuroscience. Jan. 1, 2016;23:130-4. (Year: 2016).*
Martha, S et al "Gene expression levels in acute large vessel occlusion stroke in humans" Stroke, (Feb. 2019) vol. 50, supp 1, Abst. WMP45. American Heart Association/American Stroke Association 2019 International Stroke conference and State-of-the-science Stroke Nursing Symposium. (Year: 2019).*
Fraser, J et al. "Changes in gene expression of CXCL9 in intracranial distal blood during emergent large vessel occlusion in human stroke" Journal of Neurointerventional surgery, (Jul. 2019) vol. 11, supp. supplement 1, pp. A2-A3. (Year: 2019).*
Vivian G. Cheung, et al. "Natural variation in human gene expression assessed in lymphoblastoid cells" Nature Genetics, vol. 33 , Mar. 2003, pp. 422-425. (Year: 2003).*
G. Chen et al. "Discordant Protein and mRNA Expression in Lung Adenocarcinomas " Mol Cell Proteomics. Apr. 2002; 1(4):304-13. (Year: 2002).*
R.A. Thisted, "What is a P-value?" http://www.stat.uchicago.edu/~thisted. (Year: 1998).*
Justin F Fraser, et al. "Abstract TMP107: Blood and Clot Thrombectomy Registry and Collaboration (BACTRAC) Protocol: Novel Method for Evaluating Human Stroke" Stroke. vol. 49, No. Suppl_1, Originally Published Jan. 22, 2018 (Year: 2018).*
Fraser et al. "The Blood And Clot Thrombectomy Registry And Collaboration (BACTRAC) protocol: novel method for evaluating human stroke" J NeuroIntervent Surg, Mar. 2019, vol. 11, No. 3, pp. 265-270.

* cited by examiner

*Primary Examiner* — Stephen T Kapushoc
(74) *Attorney, Agent, or Firm* — Stites & Harbison PLLC; Mandy Wilson Decker

(57) ABSTRACT

The presently-disclosed subject matter generally to methods for identifying and analyzing biomarkers to determine group effects. The presently-disclosed subject matter also relates to methods for identifying genes and proteins that increase or decrease in response to ischemic stroke damage. The disclosed subject matter further describes methods of predicting edema and infarct volume in a patient. Also described herein are methods of determining the necessity of intervention for smokers. Further disclosed herein, are methods for testing therapies for ischemic stroke.

5 Claims, 16 Drawing Sheets

MACHINE LEARNING ALGORITHM FOR PREDICTING CLINICAL OUTCOMES AND IDENTIFYING DRUG TARGETS IN ISCHEMIC STROKE

RELATED APPLICATIONS

This application claims priority from U.S. Provisional Patent Application No. 62/913,474 filed on Oct. 10, 2019 and U.S. Provisional Patent Application No. 62/945,705 filed on Dec. 9, 2019 the entire disclosures of which are incorporated herein by this reference.

GOVERNMENT INTEREST

This invention was made with government support under grant number UL1TR001998 awarded by the National Institutes of Health. The government has certain rights in the invention.

TECHNICAL FIELD

The present invention relates to methods for identifying and analyzing biomarkers to determine group effects. The presently-disclosed subject matter also relates to methods for identifying genes and proteins that increase or decrease in response to ischemic stroke damage. The disclosed subject matter further describes methods of predicting edema and infarct volume in a patient. Also described herein are methods of determining the necessity of intervention for smokers. Further disclosed herein, are methods for testing therapies for ischemic stroke.

BACKGROUND

Ischemic stroke is the fifth cause of death in the United States, accounting for 87% of all strokes.[1] Approximately 800,000 individuals are affected per year and ischemic stroke is the primary cause of severe long-term disability.[1] When a major cerebral artery is blocked by a thrombus, the occlusion causes deprivation of oxygen, glucose, and other essential nutrients to the brain which results in necrotic cerebral tissue.[2] Current treatments focus on recanalization of the occluded cerebral artery for emergent large vessel occlusions (ELVO) via intravenous administration of tissue plasminogen activator (tPA) and/or endovascular mechanical thrombectomy.[3-5] Stroke patients must be given tPA within a narrow window of 4.5 hours, while mechanical thrombectomy has an extended window of intervention up to 24 hours post-stroke.[6-8] However, ischemic stroke patients must meet particular imaging or time criteria to receive either or both treatments, and many patients are out of the 'window of opportunity', and receive only supportive care.[9]

With early reperfusion to the cerebral artery, threatened tissue in the penumbra may be salvaged.[10,11] Even if blood flow is restored, neurons in the penumbra face major challenges to their survival, such as acidosis, ion pump failure, excitotoxicity, inflammatory response, and the breakdown the blood brain barrier (BBB).[12,13] Inflammation following an acute ischemic stroke is multifaceted, and is part of the normal pathological processes involved in the post-ischemic brain. Within the first few hours, there is a rapid activation of resident microglia that start to release proinflammatory mediators from the ischemic endothelium and brain parenchyma (including interleukin-(IL)1β, IL-6, IL-12, IL-23, and tumor necrosis factor-α (TNF-α)).[14-16] Furthermore, there is an activation of peripheral immune cells including neutrophils and T-cells that can cross the damaged BBB and accumulate at the injury site in the microvascular environment. In this acute phase of ischemic stroke, more extensive damage occurs with the associated increased intracranial pressure leading to malignant cerebral edema, neuronal death, hemorrhagic transformation, and mortality.[17-19]

Mechanical thrombectomy has greatly improved the ability to restore blood flow and improve patient outcomes, even when used in selected patients up to 24 hours post-stroke onset.[20,21] The process of thrombectomy permits us, for the first time, to extract blood directly in the vicinity of the infarct from a stroke patient to provide the first glimpse into cellular/molecular events occurring during an ischemic stroke. Through the standard thrombectomy process, distal blood can be isolated within the artery immediately downstream from the clot, peripheral blood that is proximal to the clot (systemic arterial blood in the cervical carotid artery), and the thrombus itself upon removal from the human subject.[22]

Understanding molecular and cellular changes intraluminally in ischemic stroke will provide deeper insights into the inflammatory pathways involved, and could lead to the identification of prognostic biomarkers in stroke patients. This information could potentially provide benchmarks to study responses to treatment and aid in development of new therapies. The purpose of this study was to identify inflammatory genes and important immune mediators at the time of mechanical thrombectomy and which patient demographics were predictive of stroke outcomes (infarct and/or edema volume) in acute ischemic stroke patients.

Stroke pharmacotherapeutics have suffered from a series of 'failures to launch.' Despite outstanding preclinical scientific work, often with exceptional rigor, therapeutics have not crossed the chasm from pre-clinical to clinical success in human trials.[8] This problem of translation has been attributed to heterogeneity of humans compared to animals, timing of therapy, and clinical relevance of the model.[9] Therefore, the optimization of an assay that could be used as a reliable pre-clinical paradigm for candidate therapies is crucial. Such a model represents a critical need in stroke therapy. To better understand patient heterogeneity in the target clinical population, the typical BACTRAC patient from over 100 subjects was evaluated (the average patient undergoing thrombectomy), and found that the plurality of patients are 50-65 years old, with approximately 50% being female. It also observed that the mean time from last known normal to recanalization has been 5-6 hours. Follow-up outcomes that are tracked and measured for BACTRAC patients include: infarct volume on MRI 24-48 hours post-stroke, change in inpatient NIH Stroke Scale from admission to discharge, and 30-day/90-day functional and cognitive outcome score.[10]

As such, part of the project has been to modify the traditional middle cerebral artery occlusion (MCAO) model and its outcome assessments to mimic the clinical condition in order to provide a reproducible assay for trialing new stroke therapies.

Th2 Inflammatory Response In Stroke: Previous studies have evaluated the histology of thrombi removed from cranial vessels in the treatment of ischemic stroke. However, these analyses have been limited to the thrombus itself, and focused upon the clotting components within the thrombus, clot density, and concentrations of clotting factors and platelet aggregation.[11-19] While these studies are helpful in tailoring medical devices to remove the thrombus effectively, they provide little information about the pathophysiologic mechanisms of ischemia, including the local immune response. To date, there have been very few studies evaluating the presence of inflammatory substances/cells within the intracranial thrombus, and no studies to evaluate the cellular contents immediately proximal and distal to the intracranial thrombus.[20] Prior to MT, no method existed for retrieving clot and local intracranial blood from a living stroke patient. For the first time, the instant invention detected a massive increase in cytokines in the intraluminal space of the occluded artery, suggesting that the contents of these tissue compartments could have significant implications on pathology development, functional outcomes, and treatments. The novel protocol separates patient blood into plasma for protein analysis and leukocytes for either the isolation of mRNA subsequent analysis of gene expression or immunophenotyping by flow cytometry. The mRNA analyses provide insight into the intracellular mechanisms that occur during ischemia, while the expression of the plasma proteins show the extracellular communication of the cells and tissues exposed to ischemic conditions. Such gene expression analyses have been previously performed using coronary artery thrombi.[21] For the first time, the instant invention have shown the expression of inflammatory gene products in the blood and thrombi from within a stroke patient's brain. Specifically, a virtual cytokine/chemokine storm occurs in response to stroke, which is very similar to the brain's reaction to a viral infection.[22] (FIG. 2) No other study has provided such information about the microenvironment within the infarct. Furthermore, there is no methodology or instrumentation that could effectively yield this information in small animal or culture models.

Model of MCAO

The heterogeneity of human patients (i.e. gender, age, co-morbidities, and cause of the thrombus) hinders potential treatments for stroke. One such example is the use of uric acid as a treatment for stroke that is effective in women but not men.[23] This finding was initially unnoticed in the clinical trial until the results were broken out according to gender.[23][24] Because young, estrogen-producing, female rats are resistant to stroke-induced neurodegeneration,[25] females have historically been excluded from mouse models, to the detriment of the field.[26] Genetically altered rodents, particularly gene knockout mice, have been used to elucidate mechanisms ideal for therapeutic targets, but the vast majority of studies are still performed in young male animals.[27] Previous work and the proposed study use aged females to create a research environment reflective of post-menopausal patients, who incur stroke at a higher rate and with a greater disability than aged-matched men. With an increase in inflammation during aging, the typical genetic alteration could result in a very different effect in an aged rodent after experimental stroke. In the instant invention, in an embodiment all rodents will be aged to approximately 18 months so that disease pathology will be observed in the context of an aged immune system. To ensure scientific rigor, the studies will include blinding and randomization to minimize experimenter bias, which has been identified as a major contributor to past clinical failures.[28] In doing so, the novel model assay represents a 'preclinical randomized controlled trial' for testing therapeutic potential of drugs.

The instant invention's modifications made to the surgical model, to the study population, to the intra-arterial methods of drug delivery, and to the clinically-matched outcomes analysis are innovative because the animal model assay most closely resembles what is currently seen in the average ELVO patient undergoing mechanical thrombectomy. The instant invention is thus a preclinical testing assay that matches the patients who would be eligible for clinical trials of our targets moving forward. To match the typical thrombectomy patient, male and female rats are aged to 18 months. To mirror the procedure of thrombectomy, rats undergo occlusion of the cerebral artery for 5 hours, which is the average time of patient receiving this therapy after appearance of stroke. After removal of the thrombus, rats will be immediately treated through intra-arterial injection of the carotid artery, which mirrors some recent early clinical trials (clinicaltrials.gov NCT02912663 and NCT02235558).5 Regarding outcomes, the timing of MRI, along with the short-term and long-term outcomes will match those employed in the clinic.

SUMMARY

The presently-disclosed subject matter meets some or all of the above-identified needs, as will become evident to those of ordinary skill in the art after a study of information provided in this document.

This Summary describes several embodiments of the presently-disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this Summary or not. To avoid excessive repetition, this Summary does not list or suggest all possible combinations of such features.

One embodiment of the present invention is a method for identifying genes that increase or decrease expression in response to ischemic stroke damage comprising: a. collecting blood samples distal and proximal to a clot from patients undergoing a thrombectomy procedure; b. extracting total RNA from the distal and proximal blood samples; c. amplifying mRNA from total RNA; d. converting the mRNA into cDNA; e. comparing the cDNA from the distal sample to the proximal sample; and f identifying the genes associated with the cDNA increased in the distal blood sample compared to the proximal blood sample.

Another embodiment of the present invention is a method for determining predictive genes for infarct volume or edema volume comprising: a. Setting infarct volume or edema volume as response variables; b. Using demographics variables as covariates; c. Using all gene expression variables from the method of claim 1 as predictors; d. Inputting the response variable, covariates, and predictors into Random Forest machine learning; e. Using a coarse-to-fine approach with 5 or 10-fold cross-validation; f Optimizing the predicting performance by mean squared error; g. Obtaining a ranking of the importances of features; h. Repeating steps d-g multiple additional times; i. Determining the mean values of the feature importances; j. Ranking the importance scores; and 1. Determining the predictive genes for infarct volume or edema volume as the genes with the highest importance scores. In some aspects of the embodiment, steps d-g are repeated 99 additional times.

Some embodiments of the present invention include a method for determining predictive genes for stroke outcomes comprising: a. setting the top predictive genes as determined by the paragraph above, as covariates; b. setting infarct volume or edema volume as response variables; and c. using ordinary least squares regression analysis to determine the predictive genes for stroke outcomes.

Other embodiments of the present invention include a method of predicting edema and infarct volume in a patient comprising: a. collecting blood samples distal and proximal to a clot from patients undergoing a thrombectomy procedure; b. extracting total RNA from the distal and proximal blood samples; c. amplifying mRNA from total RNA; d. converting the mRNA into cDNA; e. comparing the cDNA from the distal sample to the proximal sample; f. identifying the genes associated with the cDNA increased in the distal blood sample compared to the proximal blood sample; and g. predicting larger edema or infarct volume when the genes IFNA2, CCR4, IL5, IL9, IL7, CCR3, or combinations thereof are increased in the distal blood sample compared to the proximal blood sample.

Another embodiment of the present invention include a method for identifying proteins that increase or decrease in response to ischemic stroke damage comprising: a. collecting blood samples distal and proximal to a clot from patients undergoing a thrombectomy procedure; b. extracting total protein from the distal and proximal blood samples; c. setting the proximal blood sample as an internal control for the patient and the distal blood sample as an injury site sample; d. performing proteomics analysis on the blood samples; e. identifying the proteins with the largest changes in the distal blood sample compared to the proximal blood sample.

Other embodiments of the present invention include a method for determining the necessity of intervention for smokers comprising: a. collecting blood samples distal and proximal to a clot from patients undergoing a thrombectomy procedure; b. measuring the gases in the blood samples; c. determining the ratio of intracranial:systemic gases; and d. recommending quitting smoking when the ratio of intracranial:systemic bicarbonate increases, pCO2 increases, or pO2 decreases.

Another embodiment of the present invention is a method for testing therapies for ischemic stroke comprising: a. occluding the cerebral artery of a rodent for about 5 hours; b. removing the thrombus; and c. reperfusing the cerebral artery by intra-arterial injection of the carotid; wherein the rodent is of advanced age. In some embodiments, the method further includes administering a treatment during intra-arterial injection of the carotid. In further embodiments, the rodent age is about 18 months. In some embodiments, the rodent is a rat. In further embodiments, the rodent is female. In further embodiments, the reperfusion rate is between about 2 μl/min and 3 μl/min. In some embodiments, the rodent is a male. In further embodiments, the reperfusion rate is between about 3 μl/min and 5 μl/min.

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein.

Figure 1:
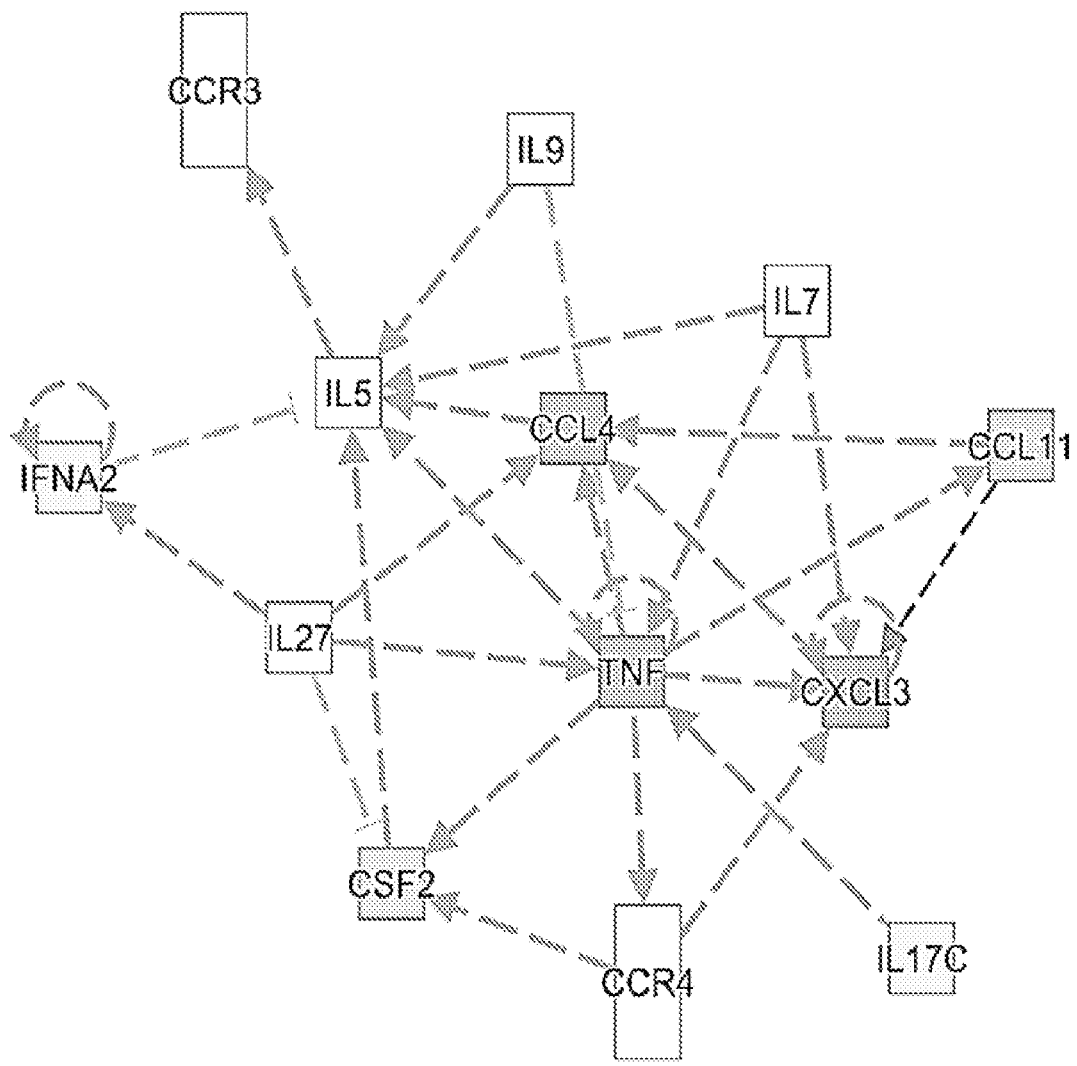
FIG. 1 shows a pathway analysis predicting the upstream and downstream effects of activation or inhibition of the thirteen genes from the distal blood in a network. A red box indicates the gene is more extreme in the dataset, while different shades of pink mean the gene is measured less in the dataset. An orange box indicates the gene has more confidence in predicted activation. Directional orange arrows indicate which gene leads to activation of another gene. Yellow arrows indicate the findings are inconsistent with downstream gene.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

All patents, patent applications, published applications and publications, GenBank sequences, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

As used herein, the abbreviations for any protective groups, amino acids and other compounds, are, unless indicated otherwise, in accord with their common usage, recognized abbreviations, or the IUPAC-IUB Commission on Biochemical Nomenclature (see, Biochem. (1972) 11(9): 1726-1732).

Although any methods, devices, and materials similar or equivalent to those described herein can be used in the practice or testing of the presently-disclosed subject matter, representative methods, devices, and materials are described herein.

Following long-standing patent law convention, the terms "a", "an", and "the" refer to "one or more" when used in this application, including the claims. Thus, for example, reference to "a biomarker" includes a plurality of such biomarkers, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, width, length, height, concentration or percentage is meant to encompass variations of in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

As used herein, the term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder.

As used herein, the term "prevent" or "preventing" refers to precluding, averting, obviating, forestalling, stopping, or hindering something from happening, especially by advance action. It is understood that where reduce, inhibit or prevent are used herein, unless specifically indicated otherwise, the use of the other two words is also expressly disclosed.

As used herein, the term "diagnosed" means having been subjected to a physical examination by a person of skill, for example, a physician, and found to have a condition that can be diagnosed or treated by the compounds, compositions, or methods disclosed herein. For example, "diagnosed with a stroke" means having been subjected to a physical examination by a person of skill, for example, a physician, and found to have a condition that is described as a stroke.

As used herein, the term "subject" refers to a target of administration. The subject of the herein disclosed methods can be a mammal or rodent. In some aspects of the present invention, the rodent is a rat. The term does not denote a particular age or sex.

As used herein, the terms "administering" and "administration" refer to any method of providing a pharmaceutical preparation to a subject. Such methods are well known to those skilled in the art and include, but are not limited to, oral administration, transdermal administration, administration by inhalation, nasal administration, topical administration, intravaginal administration, ophthalmic administration, intraaural administration, intracerebral administration, rectal administration, and parenteral administration, including injectable such as intravenous administration, intra-arterial administration, intramuscular administration, and subcutaneous administration. Administration can be continuous or intermittent. In various aspects, a preparation can be administered therapeutically; that is, administered to treat an existing disease or condition. In further various aspects, a preparation can be administered prophylactically; that is, administered for prevention of a disease or condition.

The term "effective amount" refers to an amount that is sufficient to achieve the desired result or to have an effect on an undesired condition. For example, a "therapeutically effective amount" refers to an amount that is sufficient to achieve the desired therapeutic result or to have an effect on undesired symptoms, but is generally insufficient to cause adverse side effects. The specific therapeutically effective dose level if or any particular patient will depend upon a variety of factors including the disorder being treated and the severity of the disorder; the specific composition employed; the age, bodyweight, general health, sex and diet of the patient; the time of administration; the route of administration; the rate of excretion of the specific compound employed; the duration of the treatment; drugs used in combination or coincidental with the specific compound employed and like factors well known in the medical arts. For example, it is well within the skill of the art to start doses of a compound at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products.

As used herein, the term "advanced age" refers to a subject beyond post-natal, or juvenile years. For rodents advanced age refers to a rodent that is approximately at least 15-24 months of age. In some embodiments of the instant invention, advanced age with respect to rodents refers to rodents that are at least 18 months of age.

As used herein, the term "demographics variables" refer to variables such as sex, age, race/ethnicity, BMI, comorbidities (hypertension, type 2 diabetes, hyperlipidemia, previous stroke), infarct volume, edema volume and the like.

EXAMPLES

Materials & Methods

Study Design

This study was developed from the Blood and Clot Thrombectomy Registry and Collaboration (BACTRAC) protocol: a prospectively enrolling tissue banking for emergent large vessel occlusion (ELVO) (clinicaltrials.gov NCT03153683).[22] The BACTRAC study is a non-probability sampling of subjects over 18 years old treated with mechanical thrombectomy for ELVO ischemic stroke. While the BACTRAC tissue bank is continuously enrolling, data for this study was taken from subjects enrolled May 2017 through January 2019. The Institutional Review Board approved this study, and informed consent was obtained from all subjects or legally authorized representatives.

Sample Population

Subjects (≥18 years old) were eligible for inclusion if they were hospitalized with a diagnosis for an ischemic stroke and underwent thrombectomy procedure for ELVO. Subjects were candidates for inclusion if they met criteria: informed consent was signed and dated by subject or legally authorized representative within 24 h post-thrombectomy, confirmation of acute ischemic stroke based on clinical and radiographic imaging (CT and/or MRI), intra-arterial thrombectomy as determined by neurointerventional radiology (NIR) physician, an acute thromboembolus within an intracranial artery and underwent endovascular thrombectomy procedure. Subjects were excluded if baseline urine pregnancy test was positive and/or breastfeeding and/or concurrently participated in treatment studies.

Data Collection

A medical record review was conducted to collect admission clinical and demographic variables. These variables included age, sex, ethnicity, height, weight, body mass index (BMI), comorbidities, smoking status, National Institutes of Health Stroke Scale (NIHSS), baseline computerized tomography (CT) and/or magnetic resonance imaging (MRI) scan to verify large vessel occlusion stroke/thrombectomy eligibility and CTA collateral score, and time of last known normal (LKN) symptom (prior to ischemic stroke).

Tissue removal and tissue banking protocols were previously published in detail.[22] In brief, this was a collaborative effort among the NeuroInterventional Radiology (NIR) service line and the Center for Advanced Translational Stroke Science at University of Kentucky. At the beginning of the mechanical thrombectomy procedure, during initial access through the clot to the distal intracranial vessels, the NIR physician backbleeds the microcatheter to determine if they are distal to the distal end of the thrombus. Through this, 1 ml of whole arterial blood from the microcatheter (0.021 inch inner lumen diameter. Simultaneously, the collection of 7 ml of whole arterial peripheral blood was collected from the cervical parent artery (internal carotid artery or vertebral artery) during backbleeding while initiating suction for thrombectomy. The distal (intracranial) and proximal (peripheral) blood samples were handed off to the on-call research associates who immediately processed the specimens in the wet laboratory adjacent to the angiography suite.

An additional medical chart review was conducted to gather post-thrombectomy endpoint variables: last known normal (LKN) symptom to thrombectomy completion time (infarct time), thrombolysis in cerebral infarction (TICI) scores, and NIHSS at discharge. A blinded neuroradiologist evaluated post-thrombectomy computed tomography (CT) imaging and/or magnetic resonance imaging (MRI) for infarct and edema volumes, and hemorrhagic grade. Clinical and demographic variables, along with post-thrombectomy endpoints were deidentified and maintained in the institution's REDCap software.

RNA Extraction and Amplification

The extraction of total RNA from the cellular pellet/buffy coat was collected from the stored distal and proximal arterial blood samples using the Nucleospin Blood Kit (Macherey-Nagel, Duren, Germany), per manufacturer protocol. Nanodrop Lite Spectrophotometer (Thermo-Fisher Scientific; Waltham, MA) estimated the quantity of total RNA based on the A260/A280 ratio. To validate total RNA, RNA integrity numbers (RIN) values were obtained from the hospital's Genomics Core facility. RNA integrity was assessed using the Eukaryote Total RNA Nano assay on the Agilent 2100 Bioanalyzer (Agilent Technologies, Santa Clara, CA). After analysis, RIN values were calculated using the expert software associated with the Agilent 2100 Bioanalyzer. Mean RIN values (±SD) for distal arterial blood were 8.89±0.41 (range from 8.30 to 9.60). Mean RIN values (±SD) for proximal arterial blood were 6.98±0.29 (range from 6.60 to 7.50). The RIN values indicate moderate to high quality RNA with minimal degradation.[23] $RT^2$ First Strand Kit (Qiagen) was used to synthesize cDNA which were analyzed for gene expression using Qiagen $RT^2$ Profiler PCR Array Human Inflammatory Cytokines & Receptors for 84 genes associated with inflammation and evaluated with StepOnePlus Real-Time PCR System interfaced with StepOne software (Applied Biosystems, Foster City, CA). Each gene array plate had five housekeeping genes (ACTB, B2M, GAPDH, HPRT1, and RPLP0) to normalize the gene expression data by using $\Delta\Delta CT$ method. The distal blood data for each gene was compared to proximal blood data for each subject. Proximal blood sample were used as a control, since there is not a true control.

Data Analysis

Descriptive and frequency statistics were obtained and used to characterize male and female ischemic stroke subjects. Comparisons were made for subject demographics and baseline characteristics using SPSS, version 26 software (IBM, Armonk, NY). Statistical significance (p-value of 0.05) for group differences were assessed by independent t-tests for continuous variables and Chi-square or Fisher exact tests of associations based on categorical (ordinal and binary) variables. The gene expression mean fold change values were assessed with Scikit-learn Python package (v0.21.2) for machine learning analysis.[24] Statesmodels Python package (v0.10.1) was used for ordinary least squares (OLS) regression analysis.[25]

Machine Learning

For machine learning analysis, the demographics data used included variables: sex, age, race/ethnicity, BMI, comorbidities (hypertension, type 2 diabetes, hyperlipidemia, previous stroke and atrial fibrillation), and two stroke outcomes (infarct and edema volumes). The gene expression dataset included 84 inflammatory genes. Any variables in the two stroke outcome datasets were dropped if the proportion of missing values were more than 40%. After pre-processing 89 variables were in the final dataset.

Predicting Infarct Volume

Predictive analysis was performed by using the infarct volume as the response variable, and all gene expression variables as predictors. The analysis was adjusted by using demographic variables as covariates. Regression was used to perform the predictive analysis task. Since there was a relatively small sample size with a mild number of predictors (i.e., 28 subjects with 89 predictors), a widely used machine learning method, Random Forest (RF)[26][27] was employed to complete the analysis. This method was used because of the reliable performance on small sample datasets with mixed categorical and continuous variables.

RF is an ensemble of decision trees, where each internal node represents a condition, or test, on a single predictor, aiming to split the dataset into two so that each had a similar response values. RF provides versatile, accurate, and stable predictions for supervised machine learning tasks such as regression as well as measuring the relative importance of each predictor. The importance score of a predictor is calculated by how much the variance is reduced or information gain is increased across all nodes that were used. The importance scores were scaled so the sum equals one.

Hyper-parameters of RF were selected in a coarse-to-fine approach using k-fold cross-validation (CV), which partitions the training dataset into k parts evenly, then rotationally uses k−1 parts to train the machine learning model and tests the model with the remaining one part. The parameters were first selected using the 5-fold CV, then tuned the parameters around the selected value using the 10-fold CV. Predicting performance of RF was optimized in mean squared error (MSE), which is minimized for the optimal model.

With the selected hyper-parameters, the importances of features using RF were ranked. Ranking may be affected by randomness of RF due to the correlations between some features. Therefore, RF was programed 100 times and the mean values of the feature importances were collected. The number of possible orders of the features is combinatorically large, this approach can effectively reduce but cannot fully eliminate the effect of the correlation between features.

Predicting Edema Volume

Similar to the prediction of infarct volumes, this was a regression task by using edema volumes as a response variable and the remaining gene variables as predictors. The analysis was adjusted using the demographic variables as covariates as done for the analysis of infarct volumes. Using similar preprocessing and cross validation with RF, the negative MSE was used as a score and maximized for optimal RF model. The relative importances of the predictors were also obtained for this task.

Stroke Outcomes of Infarct and Edema Volumes

Noncontrast head CT and CTA of the head and neck were obtained upon presentation to the emergency department during initial assessment for acute ischemic stroke. Siemens SOMATOM Definition Edge and SOMATOM Force CT scanners were used for all CT studies. CTA collateral scores were determined using maximum intensity projection images from CTA of the head with a scoring system described in previous work by Souza et al.[28] MRI and CT of the head without contrast were obtained following thrombectomy. MRI was performed using Siemens MAGNETOM Aera and MAGNETOM Skyra machines at magnetic field strength of 1.5 and 3.0 Tesla, respectively. Hemorrhage grade, infarct volume, and edema volume were determined on post-thrombectomy MRI of the head or CT of the head if MRI was unavailable. Hemorrhage grade was determined using a grading scale described by Hacke, et al.[29] Infarct volumes and edema volumes were calculated using post-thrombectomy MRI, or using CT if MRI was unavailable. Imaging included the entire brain on both MRI and CT examinations, and all images/slices were visually assessed for infarction or edema. When MRI was available, diffusion weighted images (DWI) were used to calculate infarct volumes, and T2 FLAIR images were used to calculate edema volumes. The areas of abnormal signal (restricted diffusion on DWI or hyperintense signal on T2 FLAIR) were manually segmented and analyzed to determine volume using ITK-SNAP software (www.itksnap.org).[30] When MRI was unavailable, CT of the head was used to calculate both infarct and edema volume. As infarct and edema were indistinguishable on CT, the same value was used for both after manually segmenting the area of abnormal hypoattenuation using ITK-SNAP. All imaging assessment, including hemorrhage grade, CTA collateral score, infarct volume, and edema volume was performed by an experienced neuroradiologist in a blinded fashion.

Results

Example 1: Sample Characteristics

Twenty-eight subjects underwent mechanical thrombectomy during the study period. The mean age of the subjects were 66±15.48 years, primarily female (61%), and the majority were Caucasian (86%). Table 1 presents baseline subject characteristics and comparisons based on sex. Similarities were exhibited between the subjects for BMI, comorbidities (hypertension, atrial fibrillation, diabetes, hyperlipidemia, previous stroke, chronic obstructive pulmonary disease, and coronary artery disease), smoking status, hemorrhagic grade, CTA collateral scores, infarct and edema volumes. The NIHSS on average went from admission score of 17±6.56 to discharge score of 11±9.54 post-thrombectomy. More males (81.8%) than females (41.2%) exhibited full perfusion to the occluded artery post-thrombectomy with a TICI score of 3 (p=0.034). The mean infarct time (LKN to thrombectomy completion time) for males was approximately 7 hours versus almost 10 hours for females (p=0.093).

TABLE 1

Baseline Demographics and Characteristics for Ischemic Stroke Subjects

|  | Males (n = 11) | Females (n = 17) | p value |
|---|---|---|---|
| Age (Years) | 68 ± 17.07 | 64 ± 14.77 | 0.606 |
| Ethnicity |  |  |  |
| African-American | 2 (18.2) | 0 (0.0) | 0.072 |
| Caucasian | 9 (81.8) | 15 (88.2) | 0.650 |
| Unknown | 0 (0.0) | 2 (11.8) | 0.254 |
| BMI |  |  |  |
| Under/Normal Weight | 4 (36.4) | 9 (52.9) | 0.409 |
| Overweight | 6 (54.5) | 6 (35.3) | 0.333 |
| Obese | 0 (0.0) | 0 (0.0) | — |
| Morbidly Obese | 1 (9.1) | 2 (11.8) | 0.831 |
| Comorbidities |  |  |  |
| Hypertension | 4 (36.4) | 11 (64.7) | 0.346 |
| Atrial Fibrillation | 3 (27.3) | 5 (29.4) | 0.907 |
| Diabetes | 1 (9.1) | 6 (35.3) | 0.127 |
| Hyperlipidemia | 3 (27.3) | 2 (11.8) | 0.313 |
| Previous Stroke | 2 (18.2) | 3 (17.6) | 0.973 |
| COPD | 1 (9.1) | 3 (17.6) | 0.545 |
| CAD | 3 (27.3) | 1 (5.9) | 0.123 |
| Smoking Status |  |  |  |
| Never | 5 (45.5) | 11 (64.7) | 0.333 |
| Currently | 4 (36.4) | 4 (23.5) | 0.481 |
| Previously (>6 months) | 2 (18.2) | 2 (11.8) | 0.650 |
| NIHSS on Admission | 17 ± 8.04 | 16 ± 5.65 | 0.732 |
| Minor Stroke (1-4) | 2 (18.2) | 1 (5.9) | 0.322 |
| Moderate Stroke (5-15) | 3 (27.3) | 6 (35.3) | 0.671 |
| Moderate/Severe (16-20) | 2 (18.2) | 6 (35.3) | 0.346 |
| Severe Stroke (≥21) | 4 (36.4) | 4 (23.5) | 0.481 |
| NIHSS at Discharge | 14 ± 14.21 | 9 ± 7.32 | 0.249 |
| Minor Stroke (1-4) | 4 (36.4) | 6 (35.3) | 0.808 |
| Moderate Stroke (5-15) | 4 (36.4) | 7 (41.2) | 0.818 |
| Moderate/Severe (16-20) | 1 (9.1) | 2 (11.8) | 0.838 |
| Severe Stroke (≥21) | 2 (18.2) | 1 (5.9) | 0.322 |
| TICI Score |  |  |  |
| 2A =< 50% Perfusion | 0 (0.0) | 1 (5.9) | 0.432 |
| 2B => 50% Perfusion | 2 (18.2) | 9 (52.9) | 0.070 |
| 3 = Full Perfusion | 9 (81.8) | 7 (41.2) | 0.034 |
| LKN to Thrombectomy Completion Time (minutes) | 416 ± 231.88 | 582 ± 249.06 | 0.093 |
| Infarct Volume (cm$^3$) | 87.90 ± 104.58 | 48.33 ± 62.30 | 0.219 |
| Edema Volume (cm$^3$) | 98.60 ± 116.01 | 48.52 ± 61.23 | 0.147 |
| Hemorrhagic Grade |  |  |  |
| None | 4 (36.4) | 4 (23.5) | 0.481 |
| HI1 | 4 (36.4) | 7 (41.2) | 0.808 |
| HI2 | 1 (9.1) | 6 (35.3) | 0.127 |
| PH1 | 1 (9.1) | 0 (0.0) | 0.220 |
| PH2 | 1 (9.1) | 0 (0.0) | 0.220 |
| CTA Collateral Score |  |  |  |
| 0 | 3 (27.3) | 2 (11.8) | 0.650 |
| 1 | 5 (45.5) | 11 (64.7) | 0.333 |
| 2 | 3 (27.3) | 4 (23.5) | 0.748 |

Values are mean ± SD or (%). Comparisons were performed with independent t-tests, Chi-square or Fisher exact tests based on distribution of data.

Example 2: Prediction of Infarct Volume with Machine Learning

For predicting infarct volume, the covariates including all 84 genes and the 10 demographic variables are all ranked in importance scores. For the ranked top k, k=1 to 84, covariates 5-fold CVs were performed to find the optimal RF model and obtain the corresponding optimal performance, which is scored in negative MSE. The importance values of the top 10 covariates, 10 for predictive analysis of infarct volume are given in Table 2. They are in descending order as follows: CCR4, IFNA2, IL-9, CXCL3, age, type 2 diabetes, IL-7, CCL4, BMI, IL-5, CCR3, TNFα, and IL-27.

TABLE 2

Importance values of top 10 variables for predicting infarct volume.

| CCR4 | 0.077 |
| IFNA2 | 0.063 |
| IL-9 | 0.053 |
| CXCL3 | 0.045 |
| Age | 0.038 |
| Diabetes | 0.036 |
| IL-7 | 0.034 |
| CCL4 | 0.029 |
| BMI | 0.028 |
| IL-5 | 0.027 |
| CCR3 | 0.023 |
| TNFα | 0.022 |
| IL-27 | 0.021 |

Example 3: Prediction of Edema Volume with Machine Learning

For predictive analysis of edema volume, in a similar way to the predictive analysis of infarct volume, the optimal performance for the top k covariates, k=1 to 84 was obtained. The importance values of the top 10 most important covariates are shown in Table 3. They are in descending order as follows: IFNA2, IL-5, CCL11, IL-17C, CCR4, IL-9, IL-7, CCR3, IL-27, type 2 diabetes, and CSF2.

TABLE 3

Importance values of top 10 variables for predicting edema volume

| IFNA2 | 0.074 |
| IL-5 | 0.070 |
| CCL11 | 0.057 |
| IL-17C | 0.045 |
| CCR4 | 0.045 |
| IL-9 | 0.044 |
| IL-7 | 0.036 |
| CCR3 | 0.035 |
| IL-27 | 0.033 |
| Diabetes | 0.032 |
| CSF2 | 0.025 |

When using infarct and edema volumes as outcome variables, selected gene subsets for these two predictive analysis had a significant overlap. The intersection of the top 10 genes from the two stroke outcomes are seven genes with type 2 diabetes, these include CCR4, IFNA2, IL-9, IL-7, IL-5, CCR3, and IL-27. This overlapping subset of genes were regarded as the most important associations at the time of mechanical thrombectomy.

Example 4: Prediction of Stroke Outcomes with Multiple Linear Regression

To validate this overlapping subset of genes, ordinary least squares (OLS) regression analysis with the top seven covariates was used. The OLS results for predictors of infarct volume and edema volume are shown in Table 4 and 5, respectively. To note, the OLS was a statistical model that assumes a linear relationship between the predictive outcome and the covariates. In contrast, the machine learning model was capable of capturing potentially highly nonlinear relationship between the outcome and the covariates.[31][32] Therefore, OLS may partially capture the association between the outcomes and the covariates. IL-9 and type 2 diabetes were predictors for infarct volume (F (8, 27=5.396, p=0.001). These predictors for infarct volume explained 53% of the total variance in the model (Table 4). Similarly, the OLS analysis was performed for predictors of edema volume. IL-9 was a predictor for edema volume (F (8, 27=2.938, p=0.028). IL-9 explains 33% of the total variance found in the model (Table 5).

TABLE 4

OLS Regression Variables Predicting Infarct Volume (n = 28)

| Variable | β | P value |
|---|---|---|
| CCR4 | −0.733 | 0.740 |
| IFNa2 | −0.104 | 0.793 |
| IL-9 | 12.146 | 0.017 |
| Diabetes | 69.942 | 0.026 |
| IL-7 | −5.277 | 0.217 |
| IL-5 | 1.205 | 0.233 |
| CCR3 | −0.084 | 0.855 |
| IL-27 | −0.683 | 0.549 |

$R^2$ = 0.654,
adjusted $R^2$ = 0.533,
df = 8,
F = 5.396,
p = 0.001
Durbin-Watson = 1.83

TABLE 5

OLS Regression Variables Predicting Edema Volume (n = 28)

| Variable | β | P value |
|---|---|---|
| CCR4 | −1.987 | 0.486 |
| IFNa2 | −0.099 | 0.848 |
| IL-9 | 13.127 | 0.040 |
| Diabetes | 57.469 | 0.140 |
| IL-7 | −8.326 | 0.134 |
| IL-5 | 2.109 | 0.110 |
| CCR3 | 0.083 | 0.889 |
| IL-27 | −0.729 | 0.693 |

$R^2$ = 0.507,
adjusted $R^2$ = 0.334,
df = 8,
F = 2.938,
p = 0.028
Durbin-Watson = 1.69

Example 5: Gene Expression of Inflammatory Markers and Ingenuity Pathways Analysis Ten inflammatory genes (CCR4, IFNA2, IL-9, CXCL3, IL-7, CCL4, IL-5, CCR3, TNFα, and IL-27) were recognized as predictors for infarct volume had mean fold change ranging from 2.56 to 35.06. While the inflammatory genes (IFNA2, IL-5, CCL11, IL-17C, CCR4, IL-9, IL-7, CCR3, IL-27, and CSF2) that were identified as predictors for edema volume had mean fold change ranging from 3.98 to 42.61. The seven important predictor genes (CCR4, IFNA2, IL-9, IL-7, IL-5, CCR3, and IL-27) that overlapped both stroke outcomes had mean fold change ranging from 3.98 to 35.06.

The mean fold changes for the 13 genes were analyzed through the use of Ingenuity Pathway Analysis (IPA) software (Qiagen Inc., https://www.qiagenbioinformatics.com/products/ingenuity-pathway-analysis).[33] IPA predicts the upstream and downstream effects of activation or inhibition of the thirteen genes from the distal blood in a pathway network. The chemokine/cytokine pattern from the distal blood overall depicts a microenvironment for chemoattraction and proliferation of immune cells, particularly in Th2 response and neutrophils (FIG. 1).

Summary

The present invention discovered the initial inflammatory responses to ischemic stroke in stroke patients. Arterial blood samples were collected at one of the earliest time-points (approximately 8 hours and 35 minutes from LKN to thrombectomy completion time) during an ongoing stroke. Expression of 13 cytokines and chemokines were induced over 2-fold in the distal blood relative to levels in the proximal blood. Machine learning identified 10 genes, along with age, type 2 diabetes, and BMI for predictors of infarct volume and 10 genes with type 2 diabetes for predictors of edema volume. In addition, there was an overlap with seven genes and type 2 diabetes as predictors for both stroke outcomes. These seven genes are related to the Th2 response, which is a T-cell response associated with allergy, cancer and autoimmunity.[34,35]

Gene Expression in Distal Blood: Using the ML technique with the BACTRAC tissue bank, distal blood is isolated within the artery just immediately downstream to the clot, peripheral blood just proximal to the clot (systemic arterial blood in the cervical carotid artery), and the thrombus itself upon removal from the human subject. The blood is separated into plasma for protein analysis and into cells for mRNA isolation for gene expression analysis. BACTRAC, as a non-probability, convenience sampling of subjects (≥18 year olds) treated with mechanical thrombectomy for emergent large vessel occlusion, collects clinical and radiographic data, in addition to the tissues for testing. To understand immediate local changes in ischemic and inflammatory pathology, relative changes of gene expression in 84 inflammatory molecules in static blood distal compared to proximal systemic blood from adults who received thrombectomy for ischemic stroke were evaluated. The initial analyses of the distal and proximal blood from 28 patients revealed a dramatic increase in many inflammatory gene products related to chemoattraction and endothelial leakage. While the initial testing group was small, machine learning methods (as detailed below) were used to screen for statistically relevant changes that could predict infarct volume. Twenty-one of these mRNAs increased over 20-fold with some as high as 100- to 155-fold in distal blood relative to proximal blood.

Stroke Outcomes of Infarct and Edema Volumes and Machine Learning: MRI was performed using Siemens MAGNETOM Aera and MAGNETOM Skyra machines at magnetic field strength of 1.5 and 3.0 Tesla, respectively. Infarct volumes and edema volumes were calculated using 24-hour post-thrombectomy MRI. Diffusion weighted images (DWI) were used to calculate infarct volumes, and T2 FLAIR images were used to calculate edema volumes. The areas of abnormal signal (restricted diffusion on DWI or hyperintense signal on T2 FLAIR) were manually segmented and analyzed to determine volume using ITK-SNAP software (www.itksnap.org).[29] All imaging assessment was performed by an experienced neuroradiologist in a blinded fashion. For machine learning analysis, the demographics data used two stroke outcomes (infarct and edema volumes). The gene expression dataset included 84 inflammatory mRNAs. Any variables in the two stroke outcome datasets were dropped if the proportion of missing values were more than 40%. After pre-processing, 84 variables were in the final dataset.

Predicting Infarct Volume and Edema: Predictive analyses were performed by using the infarct volume as the response variable, and all gene expression variables as predictors. Regression was used to perform the predictive analysis task. Since there was a relatively small sample size with a mild number of predictors (i.e., 28 subjects with 84 predictors), a widely used machine learning method, Random Forest (RF) [30,31], was employed to complete the analysis. This method was used because of the reliable performance on small sample datasets with mixed categorical and continuous variables. RF was programmed 100 times and collected the mean values of the feature importances. The number of possible orders of the features is combinatorically large, this approach can effectively reduce the effect of the correlation between features. Out of the 84 mRNAs, 10 mRNAs were determined to be significant as predictors of infarct volume as ranked by their importance values. Similar to the prediction of infarct volumes, a regression task using edema volumes as a response variable and the remaining gene variables as predictors was also performed. Ten were significant as predictors of edema according to their importance values and seven of these overlapped (TABLE 6). Next, ordinary least squares regression analysis, a statistical model that assumes a linear relationship between the predictive outcome and the covariates was performed with these seven gene products with infarct volume and edema as co-variates. In contrast, the machine learning model was capable of capturing potentially highly nonlinear relationship between the outcome and the covariates.[32 33] Therefore, OLS can partially capture the association between the outcomes and the covariates. This regression analysis was performed with the top seven gene covariates. This statistical method identified IL-9 expression as the only gene found to be predictor of infarct volume and edema. Despite a limited sample population, IL-9 is the strongest candidate for prediction of both infarct volume and edema in the patient population. However, RF still identified the other six gene products and their predictive role in edema/infarct volume, which can't be discounted.

TABLE 6

Gene Products that were predictors of both infarct volume and edema.

| Gene Products | Fold Induction in Distal Blood | Importance Value for Infarct Volume | Importance Value for Edema | Total Importance Values |
|---|---|---|---|---|
| IL-9 | 5.1 | 0.053 | 0.044 | 0.097 |
| IFNA2 | 35 | 0.063 | 0.074 | 0.137 |
| CCR4 | 7.2 | 0.077 | 0.045 | 0.122 |
| IL-5 | 9.5 | 0.027 | 0.070 | 0.097 |
| IL-7 | 4 | 0.034 | 0.036 | 0.070 |
| CCR3 | 16.4 | 0.023 | 0.035 | 0.050 |

Figure 2:
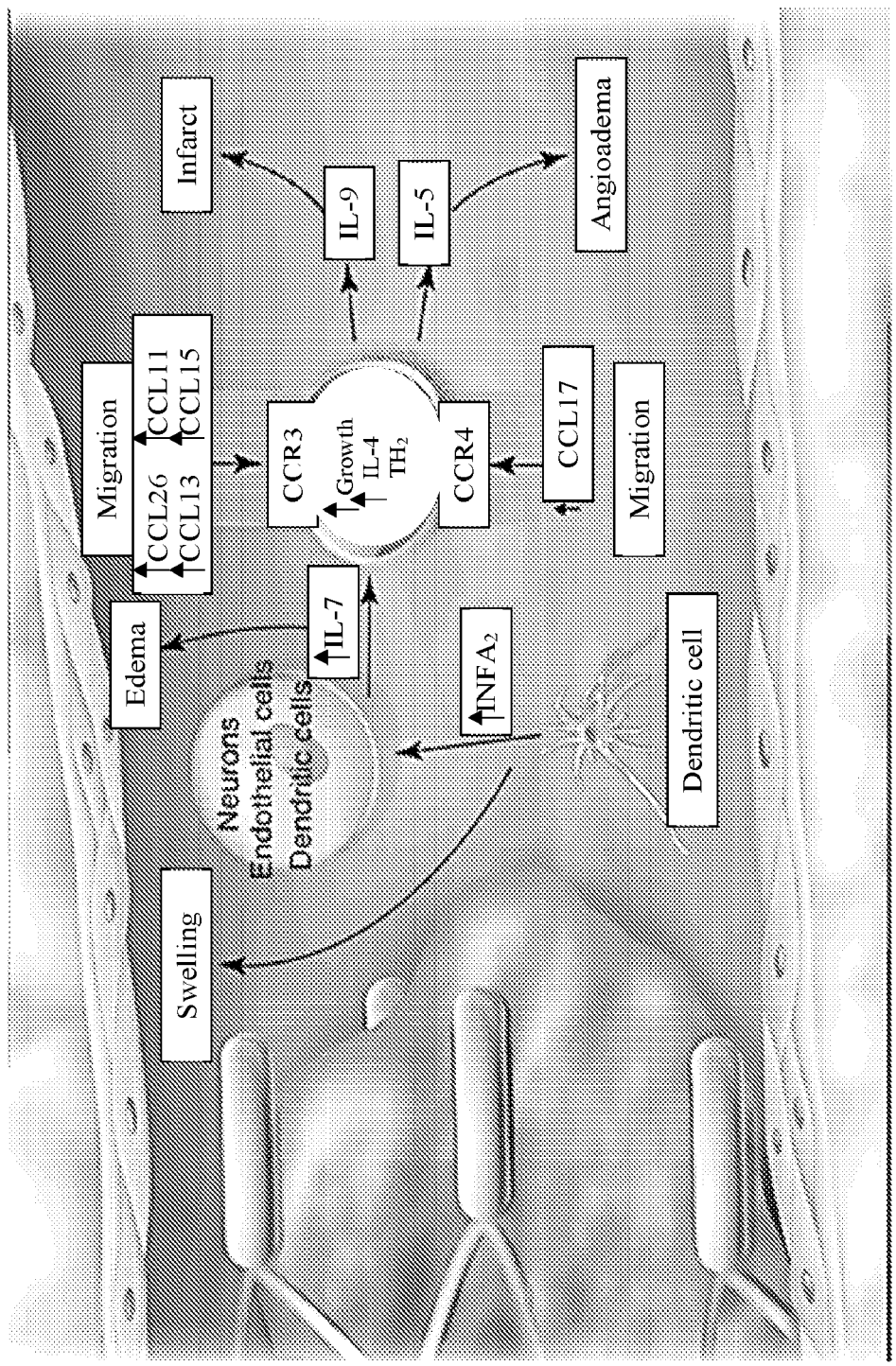
FIG. 2 shows The interrelationship of IFNa2, IL-7, CCR3, CCR4, IL-9 and IL5 in Th2 response to ischemic event.

Gene products identified by ML as predictors of Infarct volume/edema and their relationship to stroke: ML identified IL-27, IL-9, IFNa2, CCR4, IL-7, IL-5, and CCR3 as predictors for both infarct and edema volumes. This overlapping subset of expressed genes is regarded as the most important association at the time of mechanical thrombectomy. IL-27 is an inflammatory cytokine in the IL-12 family suggesting its signal would need to be blocked in ischemic stroke.[34] However, IL-27 has been shown to provide therapeutic benefit in hemorrhagic stroke,[35] so this cytokine was not pursued in the instant invention given the mixed data on its relative risks/benefit in ischemia. The other 6 gene products are closely associated during the very early acute phase of stroke and are related to the Th2 response, which is a T cell response associated with allergy, cancer and autoimmunity.[36-38] One study has shown a systemic shift of the immune system towards Th2 responses at the late post-acute phase of stroke in human patients by examining their peripheral blood.[39] FIG. 2 shows the relationship of these 6 gene products in the Th2 response as well as reported effects associated with stroke.

IL-9: Since IL-9 was identified by both ML and OLS methods as a predictor of both edema and infarct volume (Table 6), it will be the first target to be tested in the assay for stroke treatments. Tan et al. showed that IL-9 was upregulated and present in the peripheral blood mononuclear cells within 14 days after ischemic stroke in humans[40]. Furthermore, IL-9 has been shown to indirectly enhance blood brain barrier (BBB) permeability through VEGF-A secretion from astrocytes[40] and also through eNOS production in models of cerebral ischemia[41]. Finally, in a brief MCAO model (1.5 hrs occlusion) in young male rats, systemic IL-9 neutralizing antibody administration significantly improved neurological function and reduced infarct volume[41]. Currently, one pharmacologic IL-9 inhibitor is under study (BNZ-1, Bioniz Therapeutics).

IFNa2: IFNa2 is primarily produced by dendritic cells, which are converted from macrophages when exposed to antigens from tissue damage or infection.[42] Elevated expression of IFNa2 has been shown to occur in vitro after oxygen-glucose deprivation[43]. Zhang et al. demonstrated a role of IFN signaling in worsening stroke volume and outcome in a mouse model of MCAO[44]. This cytokine is targeted as a treatment for systemic lupus erythematosus, an autoimmune disease[45]. Exposure to interferon alphas has been linked to the induction of edema[46 47] and been shown to induce the production of IL-7[48].

IL-7: IL-7 is required for T cell development and function[49 50]. The expression of IL-4, a classic marker for Th2 cells, is increased by IL-7[51] and directly causes edema[52]. This cytokine's activity is targeted for diseases related to pathogenic T cells[53].

IL-5: IL-5 is expressed and secreted by Th2 cells, and is linked to edema[54]. IL-5 is produced in female mice express higher levels in the spleen relative to males[55]. Antagonists to IL-5 have been produced for the treatment of severe asthma[56].

CCR4: Th2 cells express both CCR3 and CCR4 receptors that bind chemokines to direct their migration to the site of injury or infection[57 58]. CCL17 and CCL22 are high affinity ligands for this receptor[59] and is highly expressed in thymus and peripheral blood leukocytes, and is targeted for treatment in T-cell leukemia and peripheral T-cell lymphoma[60]. CCL17 that recognizes the CCR4 receptor is also expressed at elevated levels in the distal blood.[61]

CCR3: Th2 cells express both CCR3 receptors that bind chemokines to direct their migration to the site of injury or infection. CCR3 is a chemokine receptor that has been shown to mediate neuronal injury after ischemic insult[62]. At least 8 different chemokines recognize this receptor and has shown that its activation enhances choroidal neovascularization and trafficking of eosinophils[63]. Of interest, the chemokines CCL26, CCL11, CCL13 and CCL15 all bind to CCR3 and are expressed at high levels in the distal blood and/or thrombus (data not shown). Pharmaceutical companies have targeted this receptor for the treatment of severe asthma[64].

The ML algorithm has uncovered a molecular/cellular signaling pathway that the literature supports its relationship with the facilitation of infarct volume and edema. FIG. 2 summarizes the potential interactive signaling involving these mRNAs during a stroke. The figure depicts a thrombus with a thrombectomy device removing it. Within the distal ischemic blood, dendritic cells release IFNa2 that initiates the molecular/cellular events that result in the activation of Th2 cells. The increased expression of IFNa2[46 47], IL-7[52] and IL-5[54] have all been reported to be involved in processes relating to edema while IL-9 has been shown to be directly implicated in increasing infarct volume[41].

Use of Aged Rodents in Clinically-Relevant Experimental Stroke Studies: An aged rat MCAO model was developed to address a critical issue in stroke research: the over-reliance on young male rodents. There are reported differences in the stroke response between young and aged rodents[65 66] and differences in the response between aged male and female rodents, particularly the immune response which plays a major role in stroke pathology[65-67]. Incorporating sex differences into studies on therapeutics is, crucial, especially since human females make up the majority of the BAC-TRAC human stroke study population. One important example of the failure of clinical trials related to analysis of sex is that of uric acid therapy in stroke. The trails showed that human female patients responded favorably, however, the trial 'failed' because it was not predesigned to evaluate the sexes individually.[23] It is reasonable to believe rats aged to 18 months, which is equivalent to 60 years in a human, will also function in the instant invention and males and females may be statistically treated as separate cohorts.

Figure 3:
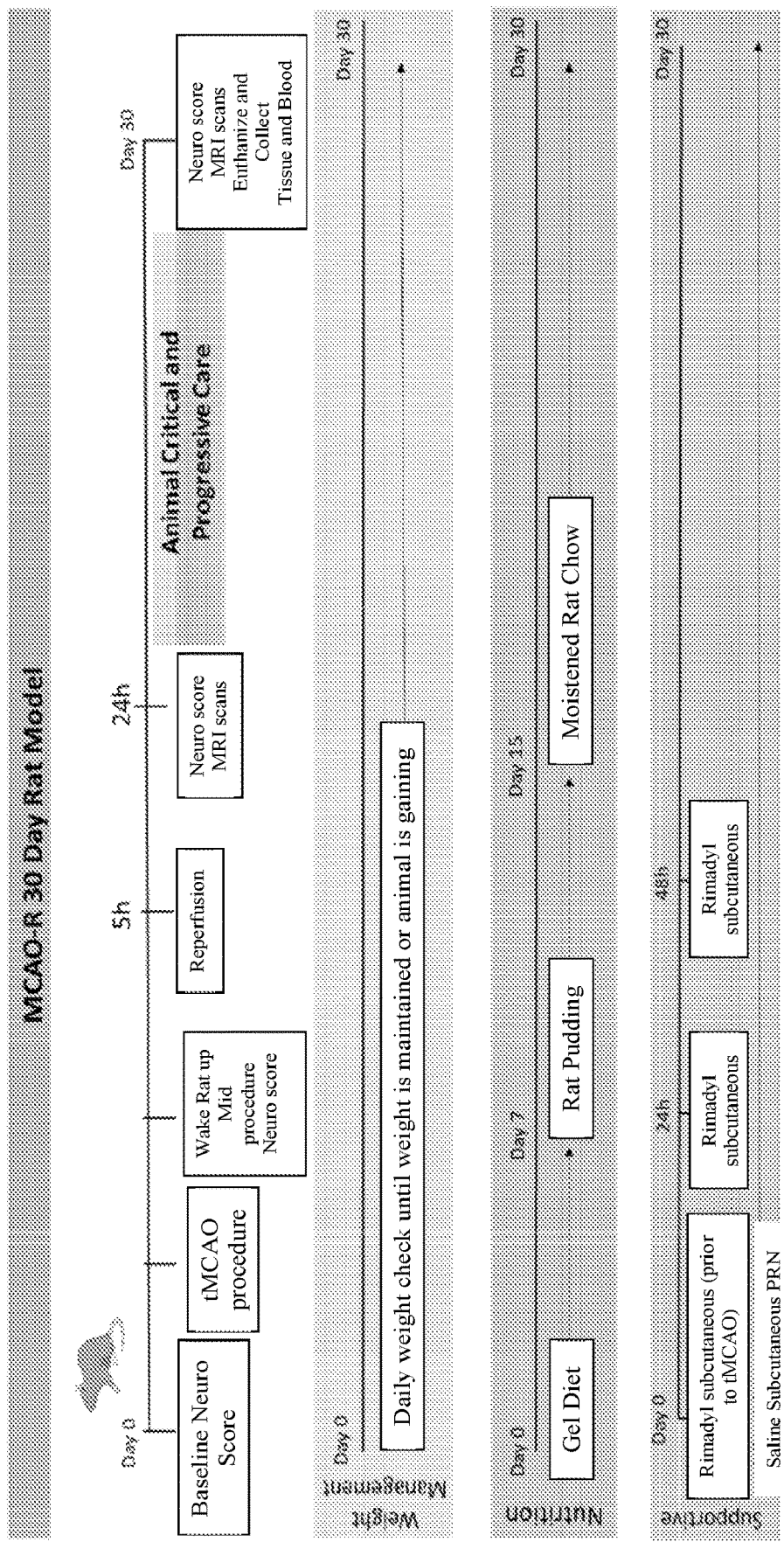
FIG. 3 shows the protocol for RatMCAO-R 30 Day Rat Model.
Figure 4A:
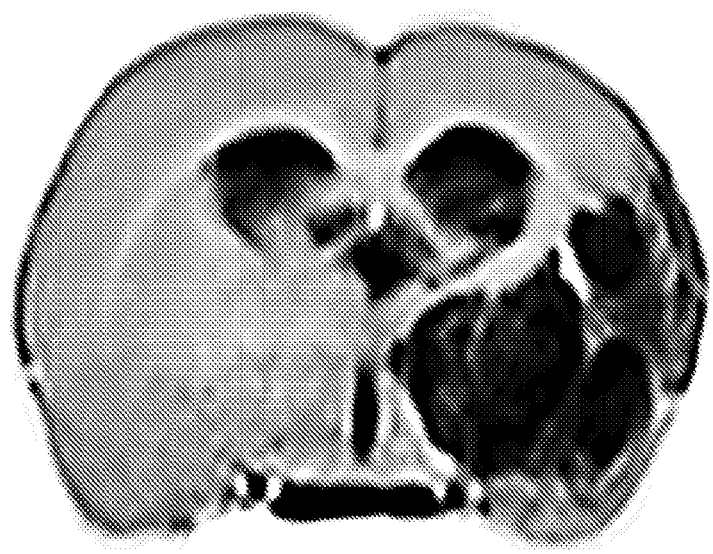
FIG. 4A shows Examples of injection rates on perfusion and SAH in MCAO-R.
Figure 4B:
FIG. 4B shows Examples of injection rates on perfusion and SAH in MCAO-R.

The MCAO model is also novel as it has been altered to simulate the human patient undergoing thrombectomy, followed by the use of the thrombectomy procedure for intra-arterial treatment delivery. The model is now modified for a 5-hour occlusion time with clinical assessment, followed by effective reperfusion and IA drug delivery. While previous experience with IA delivery after stroke modeling was in mice,[68] they cannot survive the 5-hour occlusion/reperfusion. To mimic thrombectomy, Rats were chosen for this project. In preliminary research the instant invention was successfully able to alter the model to promote survival to the 30-day endpoint, as described in FIG. 3. Furthermore, initial testing was performed out to 30 days to ensure not only survival, but also the presence of a clinically relevant permanent infarct at 30 days, along with demonstrable and stable reperfusion of the hemisphere. There are two relevant questions: Would a 5-hour MCAO-R yield an infarct that could be intervened upon? Did the process of MCAO with removal and reperfusion at 5 hours dissect or damage the vessel in a way such that long-term reperfusion was not achieved? To answer this, MRI/MRA was performed on aged animals after MCAO-R with 30-day follow-up. FIG. 4A shows a typical stroke volume of the MCAO-R. As expected, the MCAO-R results in a discrete but smaller infarct than a typical permanent model. Furthermore, in FIG. 4B, a 30-day MRA highlighting the reperfused ICA/MCA without evidence of anatomic flow compromise or continued occlusion is shown.

Figure 5A:
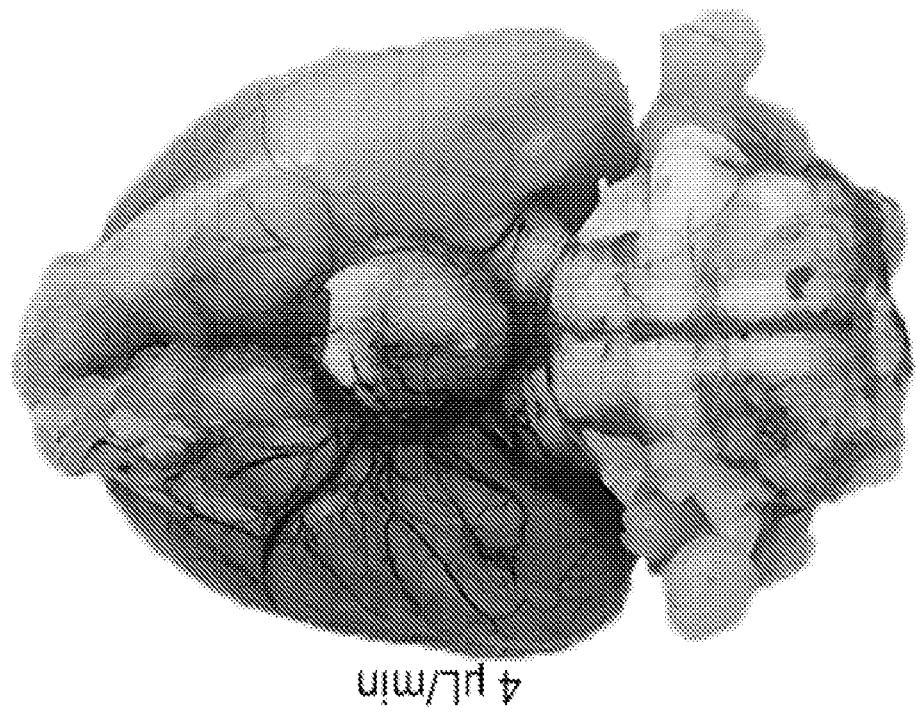
FIG. 5A shows Examples of injection rates on perfusion and SAH in MCAO-R.
Figure 5B:
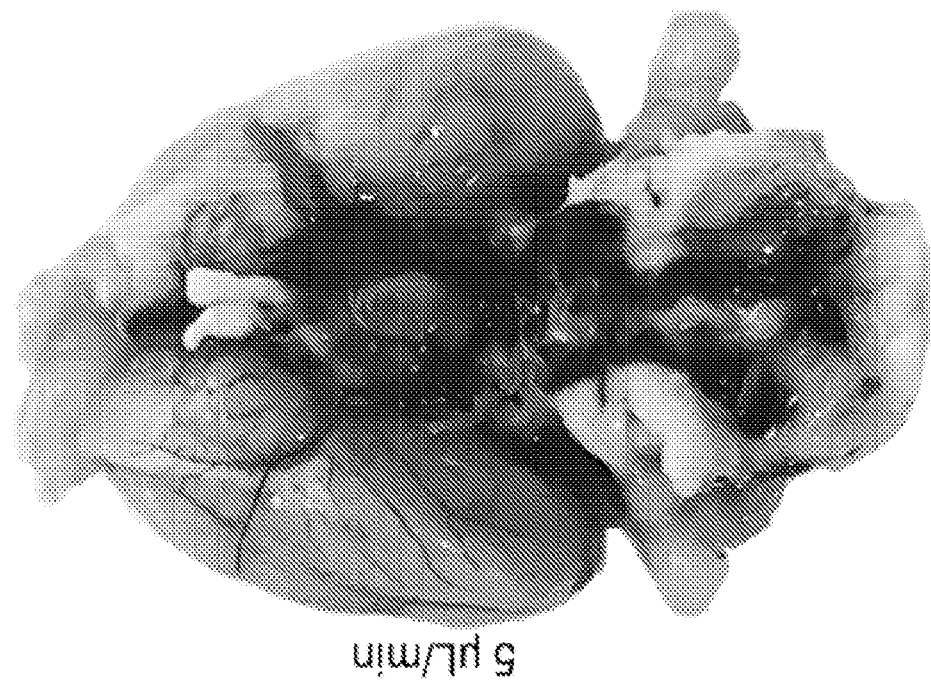
FIG. 5B shows Examples of injection rates on perfusion and SAH in MCAO-R

To ensure the delivery concerns were addressed, intra-arterial infusion optimization experiments were performed on both male and female rats. The goal was to create the lowest infusion rate that would effectively perfuse the MCA territory while minimizing the chance of vessel rupture and subarachnoid hemorrhage. Male and female rats, both naïve and after stroke, have different optimal rates. FIG. 5A-B depicts Carbon black ink dye injections into the internal carotid arteries. Through a series of changing injection paradigms, optimal injection was evaluated with complete MCA distribution without rupturing the arterial system (as evident by ink extravasation into the subarachnoid space). As an example, Panel A shows a male brain after 5 ul/min demonstrating significant focal SAH in the Circle of Willis with ink injection. By contrast, Panel B shows a similar male at 4 ul/min with good injection but no SAH. The visualized hemorrhage staining at the brainstem occurred during brain removal and not during ink injection (as no ink is present there). Similar but separate experiments were conducted for both male and female MCAO-R models, and determined optimal rates of infusion to be different for male (4 ul/min) versus females (2.5 ul/min).

Figure 6:
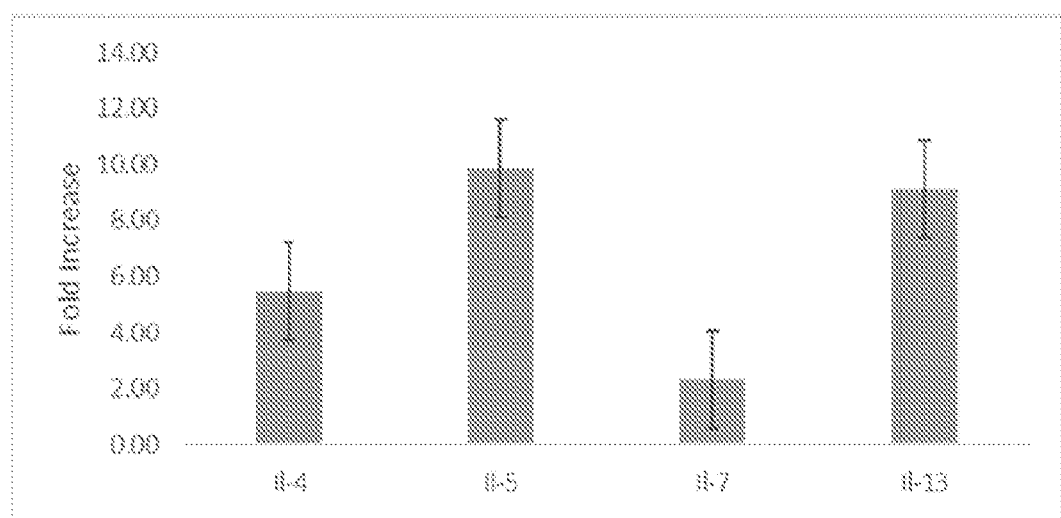
FIG. 6 shows Fold change in the expression of Th2 genes using the Rat Inflammatory PCR array comparing venous blood from post-5 h MCAO-R rats to pre-5 hr MCAO-R samples. Error bars represent Standard error of sample.

Th2 response in MCAO-R model. Venous blood was removed from the jugular vein prior to and immediately after MCAO-R procedure (n=5). As with the human studies, the relative changes of inflammatory gene expression in post-MCAO-R blood relative to samples taken prior to the surgery was evaluated. A Qiagen Rat PCR Inflammatory array was utilized which is similar to the Human one used in the study. Several genes related to the Th2 response were induced in the systemic venous blood after the MCAO-R surgery shown in FIG. 6, which is consistent with the human data. Of note, this is systemic venous blood diluted with blood draining from the contralateral hemisphere unlike the results with the human data from ischemic arterial blood at the site of the infarct. While IL-4, IL-5 and IL-7 are mentioned above, IL-13 is secreted by Th2 cells and is involved in the inflammatory processes of asthma.[72] These results support the use of this rat model for therapeutic testing to be translated to human patients.

Middle cerebral artery occlusion with reperfusion (MCAO-R): During the MCAO-R procedure, as previously described,[73] animals are placed in an induction chamber and anesthetized with 5% isoflurane/oxygen, and then maintained with a constant flow of 2-3% isoflurane in 100% oxygen at a rate of 1 L/min. A midline vertical neck incision is made, and glass rods are used to separate the large muscle pad and the sternocleidomastoid muscle (SCM). The common (CCA), external (ECA), and internal carotid (ICA) arteries are dissected and isolated. The pterygopalatine artery is identified. The first clamp is placed on the ICA prior to the pterygopalatine origin, while the second clamp is placed on the common carotid artery (CCA). The placement of the second clamp further in the posterior direction allows more room for manipulation during the embolus insertion. The ECA is isolated, and used to access the arterial system. A 20 mm 5-0 monofilament is fed distally into the ECA and advanced through to the ICA until it reaches the ICA clamp. The first clamp is removed, and the filament is advanced then sutured in place to obtain occlusion of the ICA terminal bifurcation. The second clamp is removed with careful observation of minimal blood, followed by the removal of retraction. The animal is allowed to regain consciousness for 5 hours, and then is reanesthetized for removal of the filament and potential IA infusion.

Rodent Magnetic Resonance Imaging: MRI images are acquired on a 7T Bruker Clinscan horizontal bore system (7.0T, 30 cm, 300 Hz) equipped with a triple-axis gradient system (630 mT/m and 6300 T/m/s) with a closed cycle. Diffusion Tensor Imaging (DTI) images are acquired coronally with a fat saturated, double refocused echo planar sequence: $0.297 \times 0.297 \times 0.7$ mm$^3$, TR/TE 2200/34, 128×128 matrix, 3 av, 15 slices, four b=0 volumes, 256 directions with b=800, in 28:23 minutes. T2 weighted images are acquired coronally with a fat saturated, turbo spin echo sequence: 0.125×0.125×0.4 mm$^3$ resolution, TR/TE 6000/27, 192×192 matrix, 44 slices. Rats will be anesthetized with an average of 2.25% isoflurane in oxygen, while female mice are anesthetized with an average of 1.75% isoflurane in oxygen using an MRI compatible CWE Inc. equipment (Ardmore, PA). The animals are held in place on a Bruker scanning bed with a tooth bar and tape. Body temperature, heart rate, and respiratory rates are continuously monitored throughout the MRI scans (SA Instruments, Inc., Stony Brook, NY). The animals are maintained at 37° with a water heating system built into the scanning bed. The scanning procedure takes approximately 40 minutes per animal.

MRI processing for Infarct Volume and Edema Volume: The DTI and T2 MR images are analyzed by a blinded neuroradiologist to measure the infarct volume and edema volume. These volumes are counted and the numbers are normalized to the number of images counted to provide a per section count. The volume of brain parenchyma demonstrating restricted diffusion (infarct volume) visibly affected by cerebral edema (edema volume) is calculated by manual segmentation using ITK-SNAP software. The volume of brain parenchyma visibly affected by cerebral edema (edema volume) is calculated in a similar fashion. All MRI images are analyzed by a neuroradiologist having extensive experience with imaging data analysis for stroke research in both humans and rodents.[66] The neuroradiologist routinely analyzes all MRI images for human and animal stroke studies, and is blinded to all other data (including age, sex, comorbidities, and results of any tissue evaluations).

Proteomic Changes in Intracranial Blood During Human Ischemic Stroke

Sample Acquisition and Olink Analysis:

Tissue samples were obtained and processed in accordance to the previously published BACTRAC protocol (PMID 30064997). Plasma was immediately frozen at −80° C. 40 µl aliquots of plasma were randomized and placed into a 96-well plate (Starstedt, Nümbrecht, Germany), covered with Micro-Amp clear adhesion film (Thermo-Fisher Scientific), and shipped overnight on dry ice to Olink Proteomics (Olink Proteomics, Boston, MA). Olink ran cardiometabolic and inflammatory panels on 1 µl aliquots of plasma using a proximity extension assay (PEA) with proximal blood plasma as an internal control for each subject and distal plasma as the injury site sample.

Protein Analysis:

Protein data were analyzed as average protein expression levels in distal blood plasma as compared to average protein expression levels in proximal blood plasma. The instant invention report proteomic data that includes values below the limit of detection (LOD). Data below LOD have a higher risk to be in the non-linear phase of the S-curve which may bias some estimates. However, actual data below LOD was chosen because of the large multiplate study, where LOD is a conservative measurement. Olink suggests that using actual data may increase the statistical power and give a less skewed distribution compared to replacing data below LOD with a value. Proteomic data were also analyzed excluding those values which fell below LOD and can be found in supplemental material. For sex differences, the percent change in protein expression in the distal blood as compared to the percent change in proximal blood were compared using one-tailed, unequal variance t-tests.

Patient Characteristics:

Patient demographics are shown in Table 1. There were 25 patients included in the study, of which 15 (60%) were female and all were over the age of 18. The mean age was 62 (24-91). 10 patients had a body mass index (BMI) within the normal range, 12 fell in the overweight range, and 3 fell in the obese range. 16 (64%) patients had a history of hypertension, 4 (16%) had a history of diabetes mellitus type II, 4 (16%) patients had a history of hyperlipidemia, 6 (24%) patients had a history of previous stroke, and 1 (4%) patient had a previous myocardial infarction. 15 (60%) patients had no prior history of smoking while 7 (28%) were current smokers, and 3 (12%) were previous smokers, but had not smoked within the past 6 months. According to the National Institutes of Health Stroke Score (NIHSS), on admission, 1 (4%) of patients had a minor stroke, 9 (36%) were considered to have a moderate stroke, and 8 (32%) were considered to have a moderate/severe stroke. On discharge, 10 (40%) were considered to have a minor stroke, 11 (44%) were considered to have a moderate stroke, and 1 (4%) was considered to have a severe stroke. According to the Thrombolysis in Cerebral Infarction Score (TICI), 10 (40%) had >50% perfusion and 15 (60%) had full perfusion after thrombectomy. The mean last known normal (LKN) to thrombectomy completion time was 513±246 minutes and the mean infarct volume in mm$^3$ was 58,172±82,284.

Figure 7:
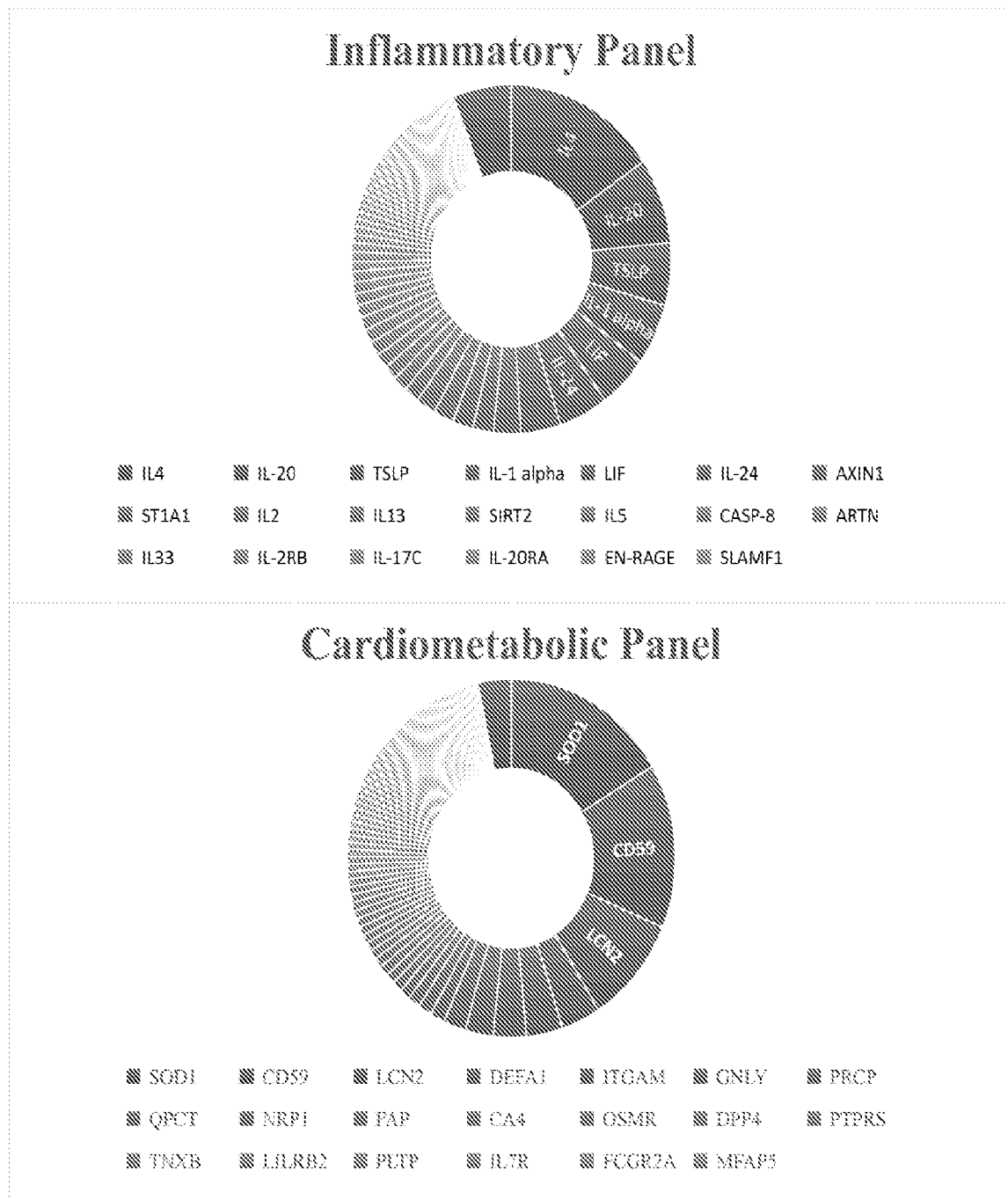
FIG. 7 shows Sunburst charts demonstrating highest levels of protein expression found in the inflammatory and cardiometabolic proteomic panels.

Cardiometabolic and Inflammatory Panels:

The cardiometabolic panel analyzed 92 protein biomarkers, including proteins involved in cellular metabolic processes, cell adhesion, immune response, and complement activation. As shown in FIG. 7, SOD1, CD59, LCN2, DEFA1, ITGAM, GNLY, PRCP, and QPCT showed the largest changes in expression in distal plasma as compared to proximal plasma.

Figure 8:
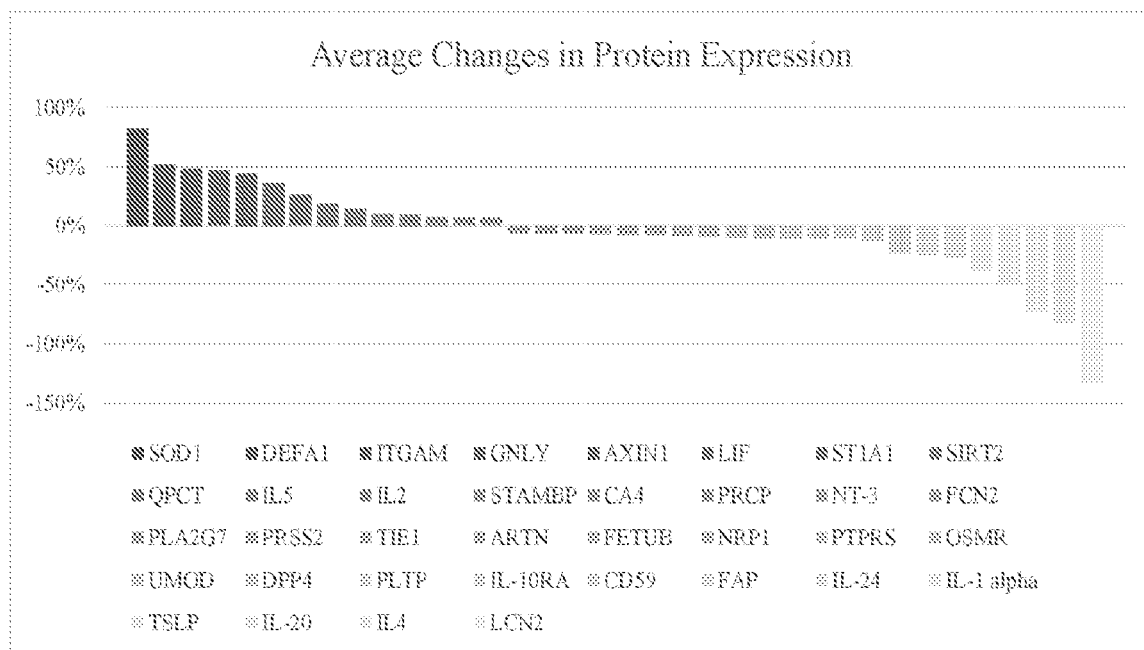
FIG. 8 shows Bar graph showing directionality of largest average protein change from combined inflammatory and metabolic panels.
Figure 9:
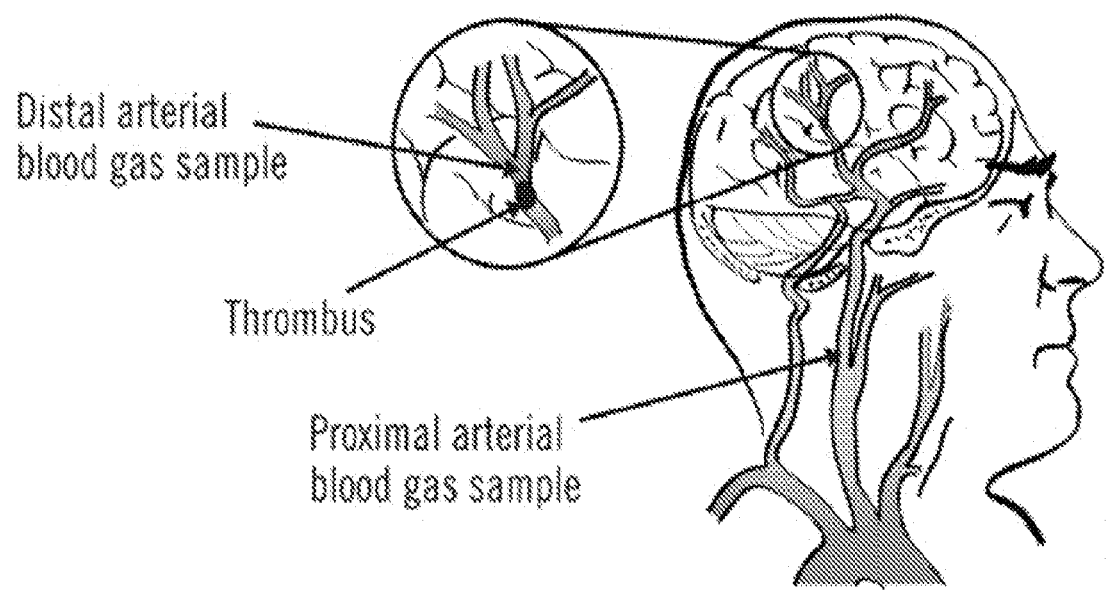
FIG. 9 shows a diagram showing where the distal and proximal samples are taken for blood gas samples.
Figure 10:
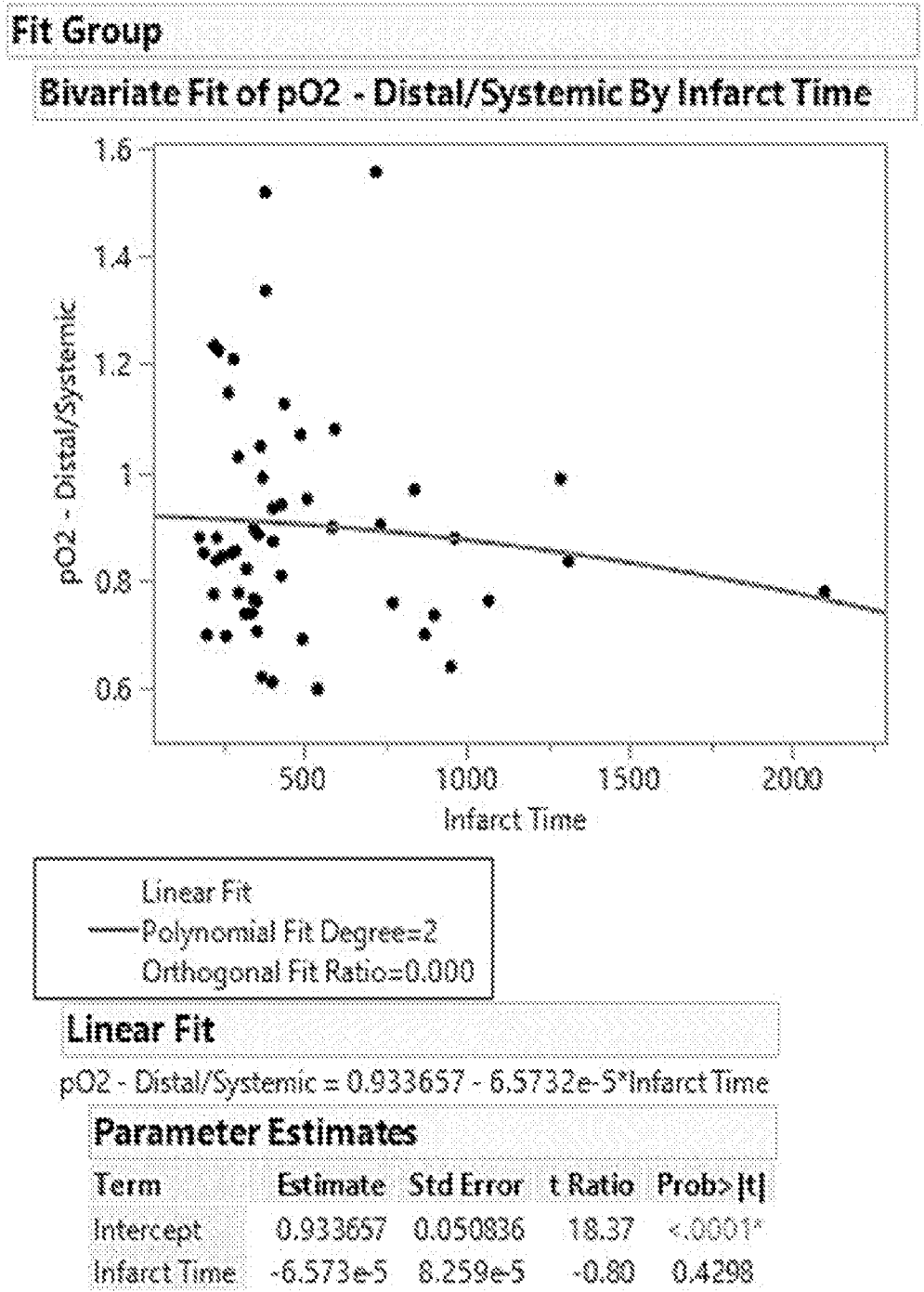
FIG. 10 shows Bivariate fit of pO2 Distal/Systemic v. Infarct time.
Figure 11:
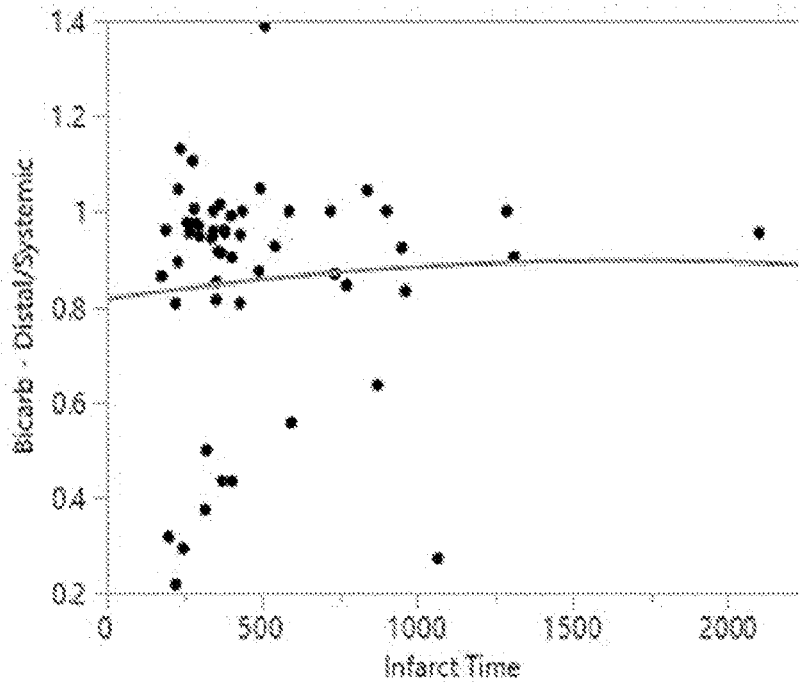
FIG. 11 shows Bivariate fit of Bicarb Distal/Systemic v. Infarct time.
Figure 12:
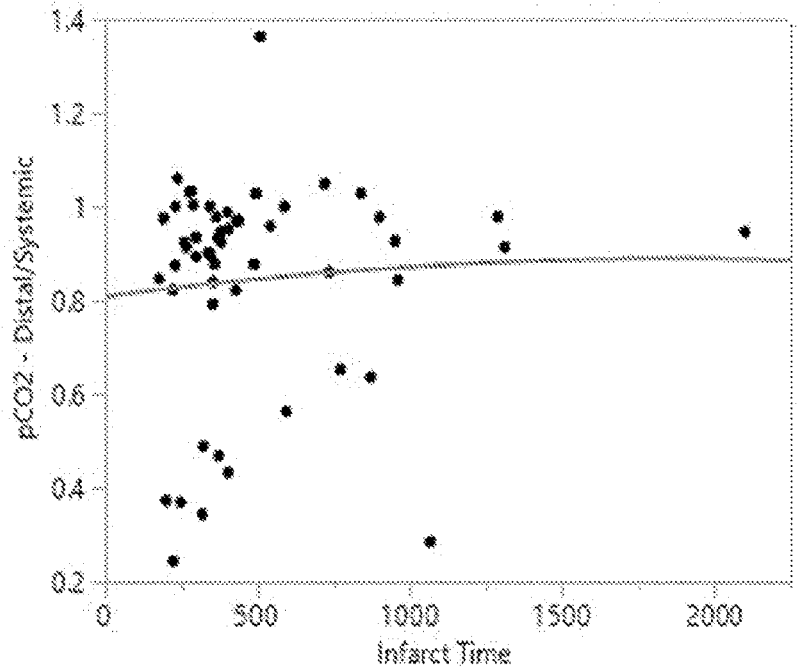
FIG. 12 shows Bivariate fit of pCO2 Distal/Systemic v. Infarct time.
Figure 13:
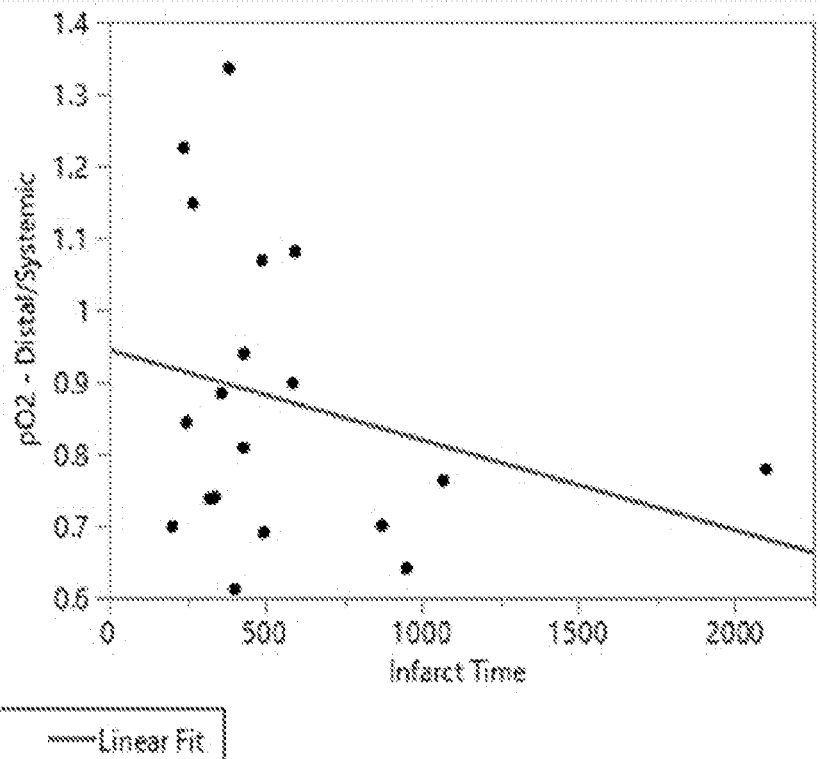
FIG. 13 shows Bivariate fit of pO2 Distal/Systemic v. Infarct time for smoking females.
Figure 14:
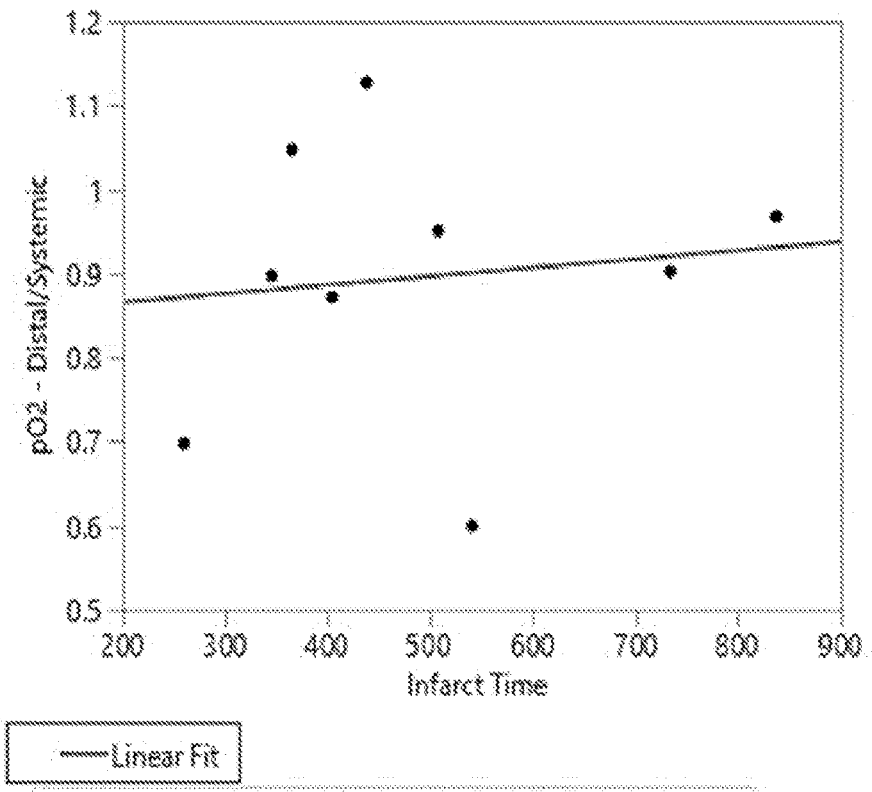
FIG. 14 shows Bivariate fit of pO2 Distal/Systemic v. Infarct time for smoking females.
Figure 15:
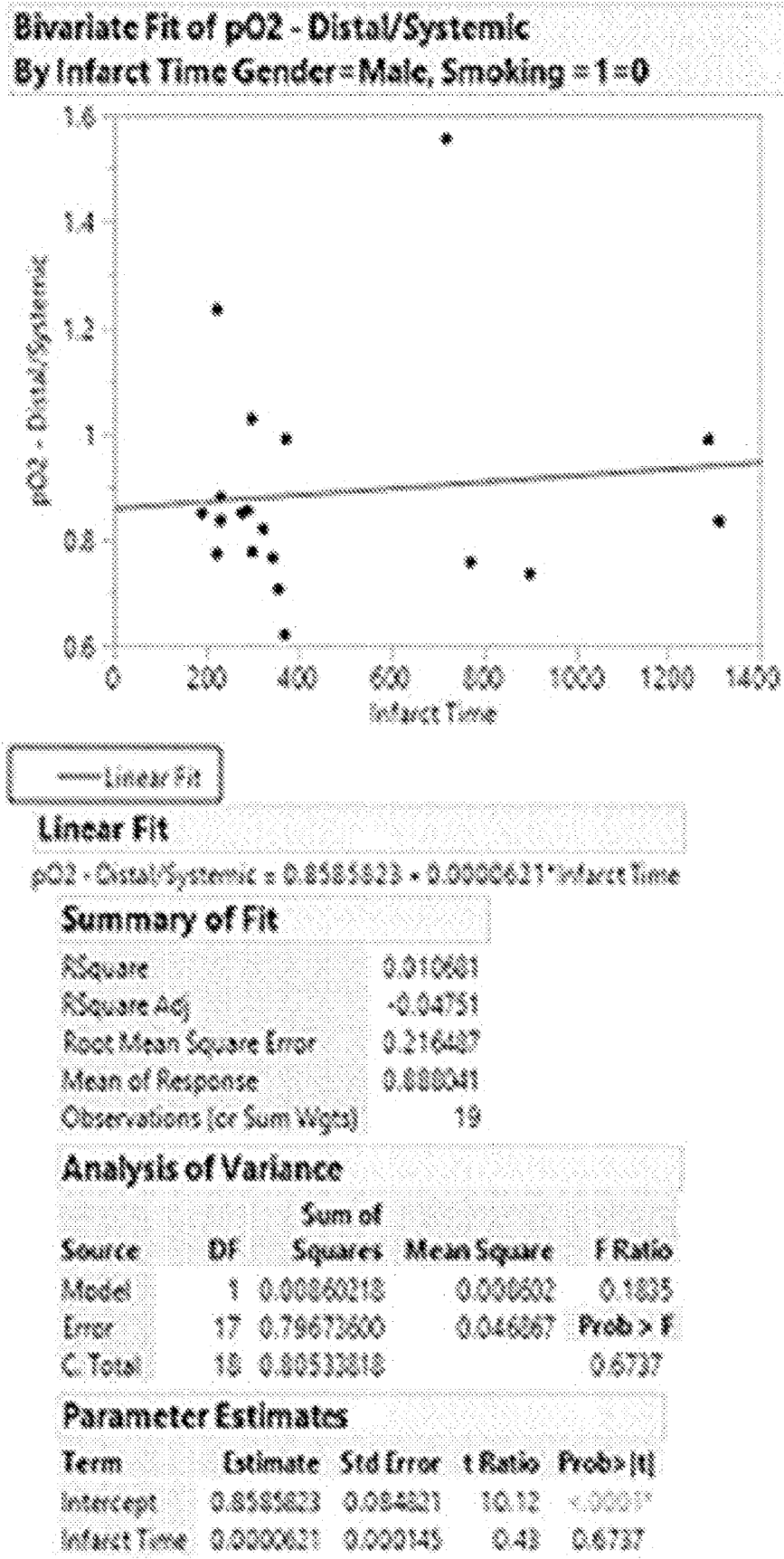
FIG. 15 shows Bivariate fit of pO2 Distal/Systemic v. Infarct time for smoking males.
Figure 16:
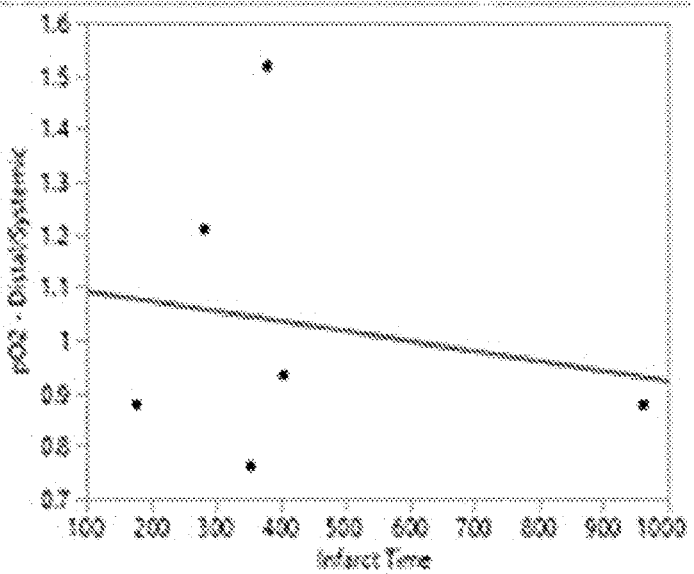
FIG. 16 shows Bivariate fit of pO2 Distal/Systemic v. Infarct time for smoking males.

The inflammatory panel was an immune-assay of 92 inflammation-related protein biomarkers. As shown in FIG. 1, IL-4, AXIN1, IL-1a, LIF, ST1A1, SIRT2, IL10RA, and IL-5 demonstrated the greatest changes in distal plasma compared to proximal plasma. FIG. 8 shows the directionality of protein expression. This figure combines the 36 proteins with the largest changes in expression in both the cardiometabolic and inflammatory panels and illustrates whether they were up-expressed or down-expressed in relation to proximal plasma.

Sex Differences:

For both cardiometabolic and inflammatory panels, protein expression levels were compared in males vs. females. In the cardiometabolic panel, three proteins were found to have near-significant differences in expression between males and females: PRCP (p=0.08), PLTP (p=0.09), and IL7R (p=0.06). In the inflammatory panel, two proteins were found to have near-significant differences in expression levels: CASP-8 (p=0.07), 4E-BP1 (p=0.08), and two proteins were found to have significant differences in expression levels: IL-20RA (p=0.04) and IL4 (p=0.03).

Evaluation of blood gases in blood specimens immediately proximal and distal to occlusive thrombi in patients undergoing mechanical thrombectomy.

Ischemic stroke is a prevalent, devastating disease with high morbidity and mortality. Despite extensive research using animal models, a significant lack of understanding of this complex phenomenon remains given the difficulty of translating basic science models to relevant clinical use. In an effort to ameliorate this problem, the instant invention includes a protocol to obtain and to analyze blood immediately proximal and distal to a thrombus in patients undergoing mechanical thrombectomy Blood samples were analyzed from the first 62 patients in the BACTRAC registry. The ratios of bicarbonate, pO2, and pCO2 of distal (intracranial) to proximal (systemic) arterial blood relative to the occlusive thrombus were plotted over time. The changes in these measures across the thrombus were also compared in smokers versus nonsmokers. Changes in blood gases over time were measured via bivariate polynomial regression analysis with 2 degrees of freedom.

The mean age of the patients was 68.9 years (25-95 years). 29 were male, 33 were female. 15 patients were current smokers (24%), 47 were non-smokers (76%), defined as never having smoked at least 6 months prior to stroke. Arterial blood gases were found to be significantly altered when plotting their ratios over time. Overall, the ratios of intracranial to systemic bicarbonate increased (0.83±0.07, P<0.001), pCO2 increased (0.81±0.07, P<0.001), and pO2 decreased (0.93±0.05, P<0.001). There were significant differences in the effect of smoking on intracranial to systemic pO2 when comparing men versus women over lengthening time of infarct. In females, smoking was found to increase intracranial to systemic pO2, but this ratio decreased in nonsmokers. This phenomenon is reversed in males. Distal to systemic pO2 decreased in male smokers but increased in male nonsmokers. There were differences over time in arterial blood gases immediately proximal and distal to thrombi in large vessel occlusive stroke. The coupled changes of bicarbonate and pCO2 suggests a compensatory acid-base process. There is a gradual decrease in distal pO2 in relation to systemic pO2 over time. Smoking appears to have opposite associations to changes in intracranial:systemic pO2 in men versus women, highlighting a potential major sex difference in how smoking affects stroke pathology.

It will be understood that various details of the presently disclosed subject matter can be changed without departing from the scope of the subject matter disclosed herein. Furthermore, the foregoing description is for the purpose of illustration only, and not for the purpose of limitation.

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

1. Benjamin E J, Muntner P, Alonso A, et al. Heart Disease and Stroke Statistics-2019 Update: A Report From the American Heart Association. *Circulation* 2019; 139(10): e56-e528. doi: 10.1161/cir.0000000000000659 [published Online First: 2019 Feb. 1]
2. Association A S. Ischemic Strokes (Clots). 2015 doi: http://www.strokeassociation.org/STROKEORG/About-Stroke/TypesofStroke/IschemicClots/Ischemic-Strokes-Clots_UCM_310939 Article.jsp #.VigNMKJ8MQU
3. Tissue plasminogen activator for acute ischemic stroke. The National Institute of Neurological Disorders and Stroke rt-PA Stroke Study Group. N Engl J Med 1995; 333(24):1581-7. doi: 10.1056/nejm199512143332401 [published Online First: 1995 Dec. 14]
4. Goyal M, Menon B K, van Zwam W H, et al. Endovascular thrombectomy after large-vessel ischaemic stroke: a meta-analysis of individual patient data from five randomised trials. *Lancet* 2016; 387(10029):1723-31. doi: 10.1016/50140-6736(16)00163-X
5. Berkhemer O A, Fransen P S, Beumer D, et al. A randomized trial of intraarterial treatment for acute ischemic stroke. *The New England journal of medicine* 2015; 372(1):11-20. doi: 10.1056/NEJMoa1411587
6. Powers W J, Rabinstein A A, Ackerson T, et al. 2018 Guidelines for the Early Management of Patients With Acute Ischemic Stroke: A Guideline for Healthcare Professionals From the American Heart Association/American Stroke Association. Stroke 2018; 49(3): e46-e110. doi: 10.1161/str.0000000000000158 [published Online First: 2018 Jan. 26]
7. Nogueira R G, Jadhav A P, Haussen D C, et al. Thrombectomy 6 to 24 Hours after Stroke with a Mismatch between Deficit and Infarct. N Engl J Med 2018; 378(1): 11-21. doi: 10.1056/NEJMoa1706442
8. Albers G W, Marks M P, Kemp S, et al. Thrombectomy for Stroke at 6 to 16 Hours with Selection by Perfusion Imaging. *N Engl J Med* 2018; 378(8):708-18. doi: 10.1056/NEJMoa1713973 [published Online First: 2018 Jan. 25]
9. Fonarow G C, Zhao X, Smith E E, et al. Door-to-needle times for tissue plasminogen activator administration and clinical outcomes in acute ischemic stroke before and after a quality improvement initiative. *JAMA* 2014; 311 (16): 1632-40. doi: 10.1001/jama.2014.3203 [published Online First: 2014 Apr. 24]
10. Doyle K P, Simon R P, Stenzel-Poore M P. Mechanisms of ischemic brain damage. Neuropharmacology 2008; 55(3):310-8. doi: 10.1016/j.neuropharm.2008.01.005 [published Online First: 2008 Mar. 1]
11. Tobin M K, Bonds J A, Minshall R D, et al. Neurogenesis and inflammation after ischemic stroke: what is known and where we go from here. J Cereb Blood Flow Metab 2014; 34(10):1573-84. doi: 10.1038/jcbfm.2014.130 [published Online First: 2014 Jul. 31]
12. Heo J H, Lucero J, Abumiya T, et al. Matrix metalloproteinases increase very early during experimental focal cerebral ischemia. J Cereb Blood Flow Metab 1999; 19(6):624-33. doi: 10.1097/00004647-199906000-00005 [published Online First: 1999 Jun. 12]
13. Mifsud G, Zammit C, Muscat R, et al. Oligodendrocyte pathophysiology and treatment strategies in cerebral ischemia. *CNS Neurosci Ther* 2014; 20(7):603-12. doi: 10.1111/cns.12263 [published Online First: 2014 Apr. 8]
14. Strbian D, Karjalainen-Lindsberg M L, Tatlisumak T, et al. Cerebral mast cells regulate early ischemic brain swelling and neutrophil accumulation. *J Cereb Blood Flow Metab* 2006; 26(5):605-12. doi: 10.1038/sj.jcbfm.9600228 [published Online First: 2005 Sep. 16]
15. Pradillo J M, Denes A, Greenhalgh A D, et al. Delayed administration of interleukin-1 receptor antagonist reduces ischemic brain damage and inflammation in comorbid rats. *J Cereb Blood Flow Metab* 2012; 32(9): 1810-9. doi: 10.1038/jcbfm.2012.101 [published Online First: 2012 Jul. 12]
16. Savage C D, Lopez-Castejon G, Denes A, et al. NLRP3-Inflammasome Activating DAMPs Stimulate an Inflammatory Response in Glia in the Absence of Priming Which Contributes to Brain Inflammation after Injury. *Front Immunol* 2012; 3:288. doi: 10.3389/fimmu.2012.00288 [published Online First: 2012 Oct. 2]
17. Mokri B. The Monro-Kellie hypothesis: applications in CSF volume depletion. *Neurology* 2001; 56(12):1746-8. doi: 10.1212/wnl.56.12.1746 [published Online First: 2001 Jun. 27]
18. Simard J M, Kent T A, Chen M, et al. Brain oedema in focal ischaemia: molecular pathophysiology and theoretical implications. *Lancet Neurol* 2007; 6(3):258-68. doi: 10.1016/s1474-4422(07)70055-8 [published Online First: 2007 Feb. 17]
19. Amantea D, Nappi G, Bernardi G, et al. Post-ischemic brain damage: pathophysiology and role of inflammatory mediators. *The FEBS journal* 2009; 276(1):13-26. doi: 10.1111/j.1742-4658.2008.06766.x [published Online First: 2008 Dec. 18]
20. Berkhemer O A, Fransen P S, Beumer D, et al. A randomized trial of intraarterial treatment for acute ischemic stroke. *N Engl J Med* 2015; 372(1):11-20. doi: 10.1056/NEJMoa1414792 10.1056/NEJMoa1411587 [published Online First: 2015 Feb. 12]
21. Albers G W, Lansberg M G, Kemp S, et al. A multicenter randomized controlled trial of endovascular therapy following imaging evaluation for ischemic stroke (DEFUSE 3). *Int J Stroke* 2017; 12(8):896-905. doi: 10.1177/1747493017701147 [published Online First: 2017 Sep. 28]
22. Fraser J F, Collier L A, Gorman A A, et al. The Blood And Clot Thrombectomy Registry And Collaboration (BACTRAC) protocol: novel method for evaluating human stroke. *J Neurointerv Surg* 2019; 11(3):265-70. doi: 10.1136/neurintsurg-2018-014118 [published Online First: 2018 Aug. 2]
23. Schroeder A, Mueller O, Stocker S, et al. The RIN: an RNA integrity number for assigning integrity values to RNA measurements. *BMC Mol Biol* 2006; 7:3. doi: 10.1186/1471-2199-7-3 [published Online First: 2006 Feb. 2]
24. Pedregosa F, Ga, #235, et al. Scikit-learn: Machine Learning in Python. *J Mach Learn Res* 2011; 12:2825-30.
25. Seabold S, Perktold J. Statsmodels: Econometric and Statistical Modeling with Python. *Proceedings of the 9th Python in Science Conference* 2010; 2010
26. Breiman L. Random Forests. *Mach Learn* 2001; 45(1):5-32. doi: 10.1023/a:1010933404324
27. Hastie T, Tibshirani R, Friedman J. The Elements of Statistical Learning. New York, NY, USA: Springer New York Inc. 2001.
28. Souza L C, Yoo A J, Chaudhry Z A, et al. Malignant CTA collateral profile is highly specific for large admission DWI infarct core and poor outcome in acute stroke. *AJNR Am J Neuroradiol* 2012; 33(7):1331-6. doi: 10.3174/ajnr.A2985 [published Online First: 2012 Mar. 3]
29. Hacke W, Kaste M, Fieschi C, et al. Randomised double-blind placebo-controlled trial of thrombolytic therapy with intravenous alteplase in acute ischaemic stroke (ECASS II). Second European-Australasian Acute Stroke Study Investigators. *Lancet* 1998; 352(9136):1245-51. [published Online First: 1998 Oct. 27]
30. Yushkevich P A, Piven J, Hazlett H C, et al. User-guided 3D active cont/9segmentation of anatomical structures: significantly improved efficiency and reliability. *Neuroimage* 2006; 31(3):1116-28. doi: 10.1016/j.neuroimage.2006.01.015 [published Online First: 2006 Mar. 21]
31. Vapnik V N. The nature of statistical learning theory: Springer-Verlag New York, Inc. 1995.
32. Vapnik V N. The Nature of Statistical Learning Theory, Second Edition: Springer 2000.
33. Kramer A, Green J, Pollard J, Jr., et al. Causal analysis approaches in Ingenuity Pathway Analysis. *Bioinformatics* 2014; 30(4):523-30. doi: 10.1093/bioinformatics/btt703 [published Online First: 2013 Dec. 18]
34. Christoffersson G, von Herrath M. Regulatory Immune Mechanisms beyond Regulatory T Cells. *Trends Immunol* 2019; 40(6):482-91. doi: 10.1016/j.it.2019.04.005 [published Online First: 2019 May 19]
35. Chraa D, Naim A, Olive D, et al. T lymphocyte subsets in cancer immunity: Friends or foes. *J Leukoc Biol* 2019; 105(2):243-55. doi: 10.1002/j1b.Mr0318-097r [published Online First: 2018 Nov. 6]
36. Theodorou G L, Marousi S, Ellul J, et al. T helper 1 (Th1)/Th2 cytokine expression shift of peripheral blood CD4+ and CD8+ T cells in patients at the post-acute phase of stroke. *Clin Exp Immunol* 2008; 152(3):456-63. doi: 10.1111/j.1365-2249.2008.03650.x [published Online First: 2008 Apr. 22]
37. Hagberg N, Berggren O, Leonard D, et al. IFN-alpha production by plasmacytoid dendritic cells stimulated with RNA-containing immune complexes is promoted by NK cells via MIP-1beta and LFA-1. *J Immunol* 2011; 186(9):5085-94. doi: 10.4049/jimmunol.1003349 [published Online First: 2011 Mar. 25]
38. Vukelic M, Li Y, Kyttaris V C. Novel Treatments in Lupus. *Front Immunol* 2018; 9:2658. doi: 10.3389/fimmu.2018.02658 [published Online First: 2018 Dec. 14]
39. Dusheiko G. Side effects of alpha interferon in chronic hepatitis C. *Hepatology* 1997; 26(3 Suppl 1):112s-21s. doi: 10.1002/hep.510260720 [published Online First: 1997 Sep. 26]
40. Rostaing L, Izopet J, Baron E, et al. Treatment of chronic hepatitis C with recombinant interferon alpha in kidney transplant recipients. *Transplantation* 1995; 59(10):1426-31. doi: 10.1097/00007890-199505270-00012 [published Online First: 1995 May 27]
41. Parker R, Dutrieux J, Beq S, et al. Interleukin-7 treatment counteracts IFN-alpha therapy-induced lymphopenia and stimulates SIV-specific cytotoxic T lymphocyte responses in SIV-infected rhesus macaques. *Blood* 2010; 116(25):5589-99. doi: 10.1182/blood-2010-03-276261 [published Online First: 2010 Sep. 16]
42. ElKassar N, Gress R E. An overview of IL-7 biology and its use in immunotherapy. *Immunotoxicol* 2010; 7(1):1-7. doi: 10.3109/15476910903453296 [published Online First: 2009 Dec. 19]
43. Moors M, Vudattu N K, Abel J, et al. Interleukin-7 (IL-7) and IL-7 splice variants affect differentiation of human neural progenitor cells. *Genes Immun* 2010; 11(1):11-20. doi: 10.1038/gene.2009.77 [published Online First: 2009 Oct. 23]
44. Hameg A, Gouarin C, Gombert J M, et al. IL-7 upregulates IL-4 production by splenic NK1.1+ and NK1.1− MHC class I-like/CD1-dependent CD4+ T cells. *J Immunol* 1999; 162(12):7067-74. [published Online First: 1999 Jun. 8]
45. Wang X M, Zhang Y G, Li A L, et al. Expressions of serum inflammatory cytokines and their relationship with cerebral edema in patients with acute basal ganglia hemorrhage. *Eur Rev Med Pharmacol Sci* 2016; 20(13):2868-71. [published Online First: 2016 Jul. 19]
46. Ellis J, van Maurik A, Fortunato L, et al. Anti-IL-7 receptor alpha monoclonal antibody (GSK2618960) in healthy subjects—a randomized, double-blind, placebo-controlled study. *Br J Clin Pharmacol* 2019; 85(2):304-15. doi: 10.1111/bcp.13748 [published Online First: 2018 Aug. 31]
47. Xia M Q, Qin S X, Wu L J, et al. Immunohistochemical study of the beta-chemokine receptors CCR3 and CCR5 and their ligands in normal and Alzheimer's disease brains. *Am J Pathol* 1998; 153(1):31-7. doi: 10.1016/s0002-9440(10)65542-3 [published Online First: 1998 Jul. 17]
48. Yamamoto S, Matsuo K, Nagakubo D, et al. A CCR4 antagonist enhances DC activation and homing to the regional lymph node and shows potent vaccine adjuvant activity through the inhibition of regulatory T-cell recruitment. *J Pharmacol Sci* 2018; 136(3):165-71. doi: 10.1016/j.jphs.2018.02.001 [published Online First: 2018 Mar. 10]
49. Zhang J, Wang H, Sherbini O, et al. High-Content Genome-Wide RNAi Screen Reveals CCR3 as a Key Mediator of Neuronal Cell Death. *eNeuro* 2016; 3(5) doi: 10.1523/eneuro.0185-16.2016 [published Online First: 2016/11/09]
50. Kitayama J, Mackay C R, Ponath P D, et al. The C-C chemokine receptor CCR3 participates in stimulation of eosinophil arrest on inflammatory endothelium in shear flow. *J Clin Invest* 1998; 101(9):2017-24. doi: 10.1172/jci2688 [published Online First: 1998 Jun. 13]
51. Gauvreau G M, FitzGerald J M, Boulet L P, et al. The effects of a CCR3 inhibitor, AXP1275, on allergen-induced airway responses in adults with mild-to-moderate atopic asthma. *Clin Exp Allergy* 2018; 48(4):445-51. doi: 10.1111/cea.13114 [published Online First: 2018 Feb. 10]
52. Yoshie O, Matsushima K. CCR4 and its ligands: from bench to bedside. *Int Immunol* 2015; 27(1):11-20. doi: 10.1093/intimm/dxu079 [published Online First: 2014 Aug. 5]
53. Kumai T, Nagato T, Kobayashi H, et al. CCL17 and CCL22/CCR4 signaling is a strong candidate for novel targeted therapy against nasal natural killer/T-cell lymphoma. *Cancer Immunol Immunother* 2015; 64(6):697-705. doi: 10.1007/s00262-015-1675-7 [published Online First: 2015 Mar. 11]
54. Butterfield J H, Leiferman K M, Abrams J, et al. Elevated serum levels of interleukin-5 in patients with the syndrome of episodic angioedema and eosinophilia. *Blood* 1992; 79(3):688-92. [published Online First: 1992 Feb. 1]
55. Tan S, Shan Y, Lin Y, et al. Neutralization of interleukin-9 ameliorates experimental stroke by repairing the blood-brain barrier via down-regulation of astrocyte-derived vascular endothelial growth factor-A. *FASEB J* 2019; 33(3):4376-87. doi: 10.1096/fj.201801595RR [published Online First: 2019 Jan. 30]
56. Kouro T, Takatsu K. IL-5- and eosinophil-mediated inflammation: from discovery to therapy. *Int Immunol* 2009; 21(12):1303-9. doi: 10.1093/intimm/dxp102 [published Online First: 2009 Oct. 13]
57. Roufosse F. Targeting the Interleukin-5 Pathway for Treatment of Eosinophilic Conditions Other than Asthma. *Front Med (Lausanne)* 2018; 5:49. doi: 10.3389/fmed.2018.00049 [published Online First: 2018 Apr. 24]
58. Jia L, Wang Y, Li J, et al. Detection of IL-9 producing T cells in the PBMCs of allergic asthmatic patients. *BMC Immunol* 2017; 18(1):38. doi: 10.1186/s12865-017-0220-1 [published Online First: 2017 Jul. 21]
59. Pflanz S, Timans J C, Cheung J, et al. IL-27, a heterodimeric cytokine composed of EBI3 and p28 protein, induces proliferation of naive CD4+ T cells. *Immunity* 2002; 16(6):779-90. doi: 10.1016/s1074-7613(02)00324-2 [published Online First: 2002 Jul. 18]
60. Takeda A, Hamano S, Yamanaka A, et al. Cutting edge: role of IL-27/WSX-1 signaling for induction of T-bet through activation of STAT1 during initial Th1 commitment. *J Immunol* 2003; 170(10):4886-90. doi: 10.4049/jimmunol.170.10.4886 [published Online First: 2003 May 8]
61. Lucas S, Ghilardi N, Li J, et al. IL-27 regulates IL-12 responsiveness of naive CD4+ T cells through Stat1-dependent and -independent mechanisms. *Proc Natl Acad Sci USA* 2003; 100(25):15047-52. doi: 10.1073/pnas.2536517100 [published Online First: 2003 Dec. 6]
62. Batten M, Li J, Yi S, et al. Interleukin 27 limits autoimmune encephalomyelitis by suppressing the development of interleukin 17-producing T cells. *Nat Immunol* 2006; 7(9):929-36. doi: 10.1038/ni1375 [published Online First: 2006 Aug. 15]
63. Stumhofer J S, Laurence A, Wilson E H, et al. Interleukin 27 negatively regulates the development of interleukin 17-producing T helper cells during chronic inflammation of the central nervous system. *Nat Immunol* 2006; 7(9): 937-45. doi: 10.1038/ni1376 [published Online First: 2006 Aug. 15]
64. Zhao X, Ting S M, Liu C H, et al. Neutrophil polarization by IL-27 as a therapeutic target for intracerebral hemorrhage. *Nature communications* 2017; 8(1):602. doi: 10.1038/s41467-017-00770-7 [published Online First: 2017 Sep. 21]
65. Banerjee C, Moon Y P, Paik M C, et al. Duration of diabetes and risk of ischemic stroke: the Northern Manhattan Study. *Stroke* 2012; 43(5):1212-7. doi: 10.1161/strokeaha.111.641381 [published Online First: 2012 Mar. 3]
66. Junker U, Jaggi C, Bestetti G, et al. Basement membrane of hypothalamus and cortex capillaries from normotensive and spontaneously hypertensive rats with streptozotocin-induced diabetes. *Acta Neuropathol* 1985; 65(3-4): 202-8. doi: 10.1007/bf00686999 [published Online First: 1985 Jan. 1]
67. Lorenzi M, Cagliero E, Toledo S. Glucose toxicity for human endothelial cells in culture. Delayed replication, disturbed cell cycle, and accelerated death. *Diabetes* 1985; 34(7):621-7. doi: 10.2337/diab.34.7.621 [published Online First: 1985 Jul. 1]
68. Ergul A, Elgebaly M M, Middlemore M L, et al. Increased hemorrhagic transformation and altered infarct size and localization after experimental stroke in a rat model type 2 diabetes. *BMC Neurol* 2007; 7:33. doi: 10.1186/1471-2377-7-33 [published Online First: 2007 Oct. 17]
69. Tureyen K, Bowen K, Liang J, et al. Exacerbated brain damage, edema and inflammation in type-2 diabetic mice subjected to focal ischemia. *J Neurochem* 2011; 116(4): 499-507. doi: 10.1111/j.1471-4159.2010.07127.x [published Online First: 2010 Dec. 8]
70. Prevalence of overweight and obesity among adults with diagnosed diabetes—United States, 1988-1994 and 1999-2002. *MMWR Morb Mortal Wkly Rep* 2004; 53(45):1066-8. [published Online First: 2004 Nov. 19].

The invention claimed is:
1. A method for treating a stroke in a subject, the method comprising:
 a) obtaining from the subject: a proximal sample comprising blood collected proximal to a cerebral thrombus; and a distal sample comprising blood collected distal to the cerebral thrombus;
 b) detecting the expression level of IFNA2, CCR4, IL5, IL9, IL7 and CCR3 mRNAs in the proximal sample and the distal sample;

c) detecting an increased expression level of IFNA2, CCR4, IL5, IL9, IL7 and CCR3 CCR3 mRNAs in the proximal sample as compared to the distal sample;
d) predicting a larger edema or infarct volume in the subject as compared to a control subject in which the expression level of IFNA2, CCR4, IL5, IL9, IL7 and CCR3 mRNAs are not increased in a proximal sample as compared to a distal sample; and
e) treating the stroke in the subject, where the treatment comprises: mechanical thrombectomy (MT), administration of tissue plasminogen activator (tPA), or administration of an IL9 neutralizing antibody.

2. The method of claim 1, further comprising isolating plasma from the samples for use in detecting the expression levels.

3. The method of claim 1, wherein detecting the expression level of IFNA2, CCR4, IL5, IL9, IL7 and CCR3 mRNAs comprises contacting the sample with a PCR array.

4. The method of claim 3, further comprising measuring a level of gene expression of a housekeeping gene.

5. The method of claim 4, wherein the housekeeping gene is selected from the group consisting of ACTB, B2M, GAPDH, HPRT1, and RPLP0.

* * * * *